US012052537B2

(12) United States Patent
Zhang et al.

(10) Patent No.: US 12,052,537 B2
(45) Date of Patent: Jul. 30, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 0 days.

(21) Appl. No.: 18/438,169

(22) Filed: Feb. 9, 2024

(65) Prior Publication Data

US 2024/0187780 A1 Jun. 6, 2024

Related U.S. Application Data

(63) Continuation of application No. PCT/CN2023/117783, filed on Sep. 8, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 1/10* (2006.01)
*H04R 1/02* (2006.01)

(52) U.S. Cl.
CPC ............. *H04R 1/1075* (2013.01); *H04R 1/02* (2013.01); *H04R 1/1008* (2013.01); *H04R 1/105* (2013.01); *H04R 2460/11* (2013.01)

(58) Field of Classification Search
CPC . H04R 1/02; H04R 1/08; H04R 1/083; H04R 1/105; H04R 1/1016; H04R 1/1075;
(Continued)

(56) References Cited

U.S. PATENT DOCUMENTS 11,838,705 B2 12/2023 Zheng et al.
2007/0009133 A1 1/2007 Gerkinsmeyer
(Continued)

FOREIGN PATENT DOCUMENTS

CN 203968330 U 11/2014
CN 110958526 A 4/2020
(Continued)

OTHER PUBLICATIONS

International Search Report in PCT/CN2023/117783 mailed on Nov. 16, 2023, 7 pages.
(Continued)

*Primary Examiner* — Thang V Tran
(74) *Attorney, Agent, or Firm* — METIS IP LLC

(57) ABSTRACT

Embodiments of the present disclosure provide an earphone, comprising a sound production component including a transducer and a housing. The earphone further includes and an ear-hook, wherein the ear-hook places the sound production component at a position near an ear canal but not blocking the ear canal. The sound production component and the ear-hook have a first projection and a second projection, respectively, on a sagittal plane. A first distance exists between a centroid of the first projection and a highest point of the second projection along a vertical axis direction, and a ratio of the first distance to a height of the second projection along the vertical axis direction is in a range of 0.35 to 0.6. A sound outlet is provided on an inner side surface of the housing, other side surfaces of the housing are provided with one or more pressure relief holes.

20 Claims, 14 Drawing Sheets

100

(30) Foreign Application Priority Data

| | | |
|---|---|---|
| Dec. 30, 2022 | (WO) | PCT/CN2022/144339 |
| Mar. 2, 2023 | (WO) | PCT/CN2023/079404 |
| Mar. 2, 2023 | (WO) | PCT/CN2023/079409 |
| Mar. 2, 2023 | (WO) | PCT/CN2023/079410 |

(58) Field of Classification Search

CPC .... H04R 1/345; H04R 1/1066; H04R 1/1058; H04R 1/222; H04R 3/005; H04R 5/0335; H04R 25/60; H04R 25/607; H05R 1/1008

See application file for complete search history.

(56) References Cited

U.S. PATENT DOCUMENTS

| | | | | |
|---|---|---|---|---|
| 2016/0134957 | A1* | 5/2016 | Jentz | H04R 1/105 381/380 |
| 2017/0230741 | A1 | 8/2017 | Matsuo et al. | |
| 2020/0196062 | A1 | 6/2020 | Zhang | |
| 2020/0322712 | A1 | 10/2020 | Williams et al. | |
| 2021/0067857 | A1* | 3/2021 | Struzik | H04R 1/345 |
| 2022/0095029 | A1* | 3/2022 | Zheng | H04R 1/1091 |
| 2022/0386006 | A1* | 12/2022 | Meyberg Guzman | H04R 25/407 |
| 2023/0061686 | A1* | 3/2023 | Wolfl | H04R 1/2853 |
| 2023/0130211 | A1 | 4/2023 | Li et al. | |
| 2023/0179907 | A1* | 6/2023 | Zhang | H04R 1/1066 381/381 |

FOREIGN PATENT DOCUMENTS

| | | | |
|---|---|---|---|
| CN | 212572912 | U | 2/2021 |
| CN | 212909891 | U | 4/2021 |
| CN | 113301463 | A | 8/2021 |
| CN | 113542956 | A | 10/2021 |
| CN | 113556638 | A | 10/2021 |
| CN | 113573215 | A | 10/2021 |
| CN | 113905304 | A | 1/2022 |
| CN | 114286220 | A | 4/2022 |
| CN | 114286228 | A | 4/2022 |
| CN | 114286236 | A | 4/2022 |
| CN | 216357224 | U | 4/2022 |
| CN | 114554339 | A | 5/2022 |
| CN | 115175069 | A | 10/2022 |
| JP | 2001326986 | A | 11/2001 |

OTHER PUBLICATIONS

Written Opinion in PCT/CN2023/117783 mailed on Nov. 16, 2023, 7 pages.

* cited by examiner

EARPHONES

CROSS REFERENCE TO RELATED APPLICATIONS

This application is a continuation of international application No. PCT/CN2023/117783, filed on Sep. 8, 2023, which claims priority to Chinese application No. 202211336918.4, filed on Oct. 28, 2022, claims priority to Chinese application No. 202223239628.6, filed on Dec. 1, 2022, claims priority to international application No. PCT/CN2022/144339, filed on Dec. 30, 2022, claims priority to international application No. PCT/CN2023/079409, filed on Mar. 2, 2023, claims priority to international application No. PCT/CN2023/079410, filed on Mar. 2, 2023, and claims priority to international application No. PCT/CN2023/079404, filed on Mar. 2, 2023, and the entire contents of each of which are incorporated herein by reference.

TECHNICAL FIELD

The present disclosure relates to the field of acoustic technology, and in particular, to an earphone.

BACKGROUND

With the development of acoustic output technology, an acoustic device (e.g., an earphone) has been widely used in people's daily lives, which can be used referring to an electronic device such as a mobile phone and a computer to provide a user with an auditory feast. Earphones can generally be classified into head-mounted type, ear-hook type, and in-ear devices according to the way users wear them. The output performance of the earphone has a great impact on the user's comfort.

Therefore, there is a need to provide an earphone to improve the output performance of the earphone.

SUMMARY

One of the embodiments of the present disclosure provides an earphone, comprising: a sound production component, including a transducer and a housing accommodating the transducer. The earphone further includes and an ear-hook, the ear-hook being configured to place the sound production component at a position adjacent to an ear canal but not blocking the ear canal in a wearing state. The sound production component and an auricle have a first projection and a second projection, respectively, on a sagittal plane, a first distance exists between a centroid of the first projection and a highest point of the second projection along a vertical axis direction, a ratio of the first distance to a height of the second projection along the vertical axis direction is in a range of 0.35 to 0.6. The housing is provided with a sound outlet on an inner side surface facing the auricle for directing a sound generated by the transducer out of the housing and to the ear canal, one or more pressure relief holes are provided on one or more other side surfaces of the housing, and a distance between a projection point of a center of at least one pressure relief hole of the one or more pressure relief holes on the sagittal plane and a projection point of a ⅓ point of a lower boundary of the inner side surface on the sagittal plane is in a range of 13.76 mm to 20.64 mm or 8.16 mm to 12.24 mm.

One of the embodiments of the present disclosure further provides an earphone, comprising: a sound production component, comprising a transducer and a housing accommodating the transducer. The earphone further includes an ear-hook, the ear-hook being configured to place the sound production component at a position adjacent to an ear canal but not blocking the ear canal in a wearing state. The sound production component and an auricle have a first projection and a second projection, respectively, on a sagittal plane, a first distance exists between a centroid of the first projection and a highest point of the second projection along a vertical axis direction, a ratio of the first distance to a height of the second projection along the vertical axis direction is in a range of 0.25 to 0.4. The housing is provided with a sound outlet on an inner side surface facing the auricle for directing a sound generated by the transducer out of the housing, one or more pressure relief holes are provided on one or more other side surfaces of the housing, and the one or more pressure relief holes includes a first pressure relief hole, the first pressure relief hole being provided on an upper side surface of the housing.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, wherein.

DETAILED DESCRIPTION

Figure 1:
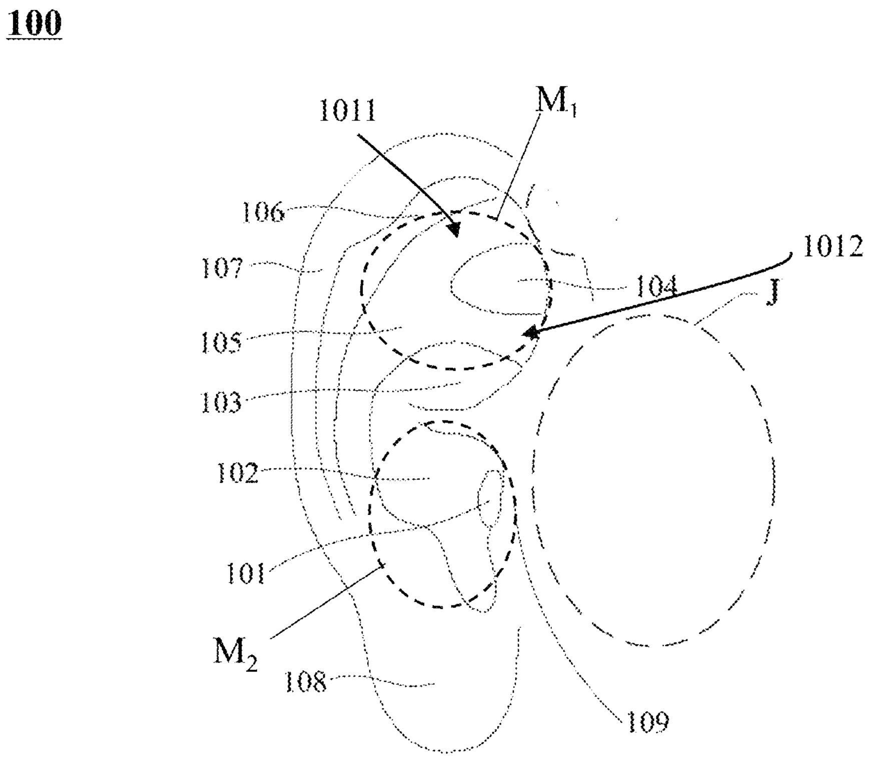
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Unless obviously obtained from the context or the context illustrates otherwise, the same numeral in the drawings refers to the same structure or operation.

It should be understood that the terms "system," "device," "unit" and/or "module" as used herein is a way to distinguish between different components, elements, parts, sections or assemblies at different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "include," and/or "comprising," "including," when used in the present disclosure, specify the presence of stated features, integers, steps, operations, elements, and/or components, but do not preclude the presence or addition of one or more other features, integers, steps, operations, elements, components, and/or groups thereof.

In the description of the present disclosure, it should be understood that the terms "first," "second," "third," and "fourth" are used for descriptive purposes only and are not to be understood as indicating or implying relative importance or implicitly specifying the number of technical features indicated. Thereby, the limitations "first," "second," "first," "second," "third," and "fourth" may expressly or implicitly include at least one such feature. In the description of the present disclosure, "multiple" means at least two, such as two, three, etc., unless otherwise expressly and specifically limited.

In the present disclosure, unless otherwise expressly specified and limited, the terms "connected," "fixed," etc., shall be understood in a broad sense. For example, the term "connection" refers to a fixed connection, a detachable connection, or an integral part; a mechanical connection, or an electrical connection; a direct connection, or an indirect connection through an intermediate medium; a connection within two components or an interaction between two components, unless otherwise expressly limited. For those skilled in the art, the specific meaning of the above terms in the present disclosure can be understood on a case-by-case basis.

FIG. 1 is a schematic diagram illustrating an exemplary ear according to some embodiments of the present disclosure. As shown in FIG. 1, an ear 100 may include an external ear canal 101, a cavum concha 102, a cymba concha 103, a triangular fossa 104, an antihelix 105, a scapha 106, a helix 107, an earlobe 108, and a helix foot 109. It should be noted that, for ease of description, in some embodiments of the present disclosure, a superior crus of antihelix 1011, an inferior crus of antihelix 1012, and the antihelix 105 are collectively referred to as an antihelix region. In some embodiments, one or more parts of the ear 100 may be used to support an earphone for stable wearing to achieve stable wearing of the earphone. In some embodiments, parts of the ear 100 such as the external ear canal 101, the cavum concha 102, the cymba concha 103, the triangular fossa 104, etc., have a certain depth and volume in the three-dimensional space, which may be used to meet wearing requirements of the earphone. For example, the earphone (e.g., an in-ear earphone) may be worn in the external ear canal 101. In some embodiments, the wearing of the earphone may be achieved with the aid of other parts of the ear 100 other than the external ear canal 101. For example, the wearing the earphone may be achieved with the aid of the cymba concha 103, the triangular fossa 104, the antihelix 105, the scapha 106, the helix 107, or a combination thereof. In some embodiments, to improve the comfort and reliability of the earphone in wearing, parts such as a user's earlobe 108 may also be used. By utilizing parts of the ear 100 other than the external ear canal 101 for the wearing of the earphone and the transmission of sound, the user's external ear canal 101 may be "liberated." When the user wears the earphone (e.g., an open earphone), the earphone does not block the external ear canal 101 of the user, and the user may receive both sounds from the earphone and sounds from the environment (e.g., horn sounds, car bells, surrounding voices, traffic commands, etc.), thereby reducing the probability of traffic accidents. In some embodiments, the earphone may be designed to adapt to the ear 100 according to the construction of the ear 100 to enable a sound production component of the earphone to be worn at various positions of the ear. For example, when the earphone is an open earphone, the open earphone may include a suspension structure (e.g., an ear-hook) and a sound production component. The sound production component is physically connected to the suspension structure. The suspension structure may be matched to a shape of an auricle to place an entire or partial structure of the sound production component at a front side of the helix foot 109 (e.g., a region J enclosed by the dashed line in FIG. 1). As another example, when the user wears the open earphone, the entire or partial structure of the sound production component may be in contact with an upper part of the external ear canal 101 (e.g., a location where one or more parts such as the helix foot 109, the cymba concha 103, the triangular fossa 104, the antihelix 105, the scapha 106, or the helix 107, etc., are located). As yet another example, when the user wears the open earphone, the entire or partial structure of the sound production component may be located in a cavity (e.g., the region $M_1$ enclosed by the dashed line in FIG. 1 containing at least the cymba concha 103 and the triangular fossa 104 and the region $M_2$ containing at least the cavum concha 102) formed by one or more parts (e.g., the cavum concha 102, the cymba concha 103, the triangular fossa 104, etc.) of the ear 100.

Different users may have individual differences, resulting in different shapes, dimensions, etc., of ears. For ease of description and understanding, unless otherwise specified, the present disclosure primarily uses an ear model with a "standard" shape and dimension as a reference and further describes the wearing manners of the earphone in different embodiments on the ear model. For example, a simulator (e.g., GRAS KEMAR, HEAD Acoustics, B&K 4128 series, or B&K 5128 series) with a head and (left and right) ears, produced based on standards such as ANSI: S3.36, S3.25, and IEC: 60318-7, may be used as a reference for wearing the earphones to present a scenario in which most users wear the earphone normally. Taking GRAS KEMAR as an example, the simulator of the ear may be any one of GRAS 45AC, GRAS 45BC, GRAS 45CC, GRAS 43AG, etc. Taking HEAD Acoustics as another example, the simulator of the ear may be any one of HMS II.3, HMS II.3 LN, HMS II.3LN HEC, etc. It should be noted that a data range obtained in the embodiments of the present disclosure is obtained based on GRAS 45BC KEMAR, but it should be understood that there may be differences between different head and ear models, and ranges of relevant data may fluctuate within ±10% when using other models. Merely by way of example, an ear model used for reference may have the following relevant features: a projection of the auricle on a sagittal plane may have a dimension in a range of 55 mm to 65 mm in a vertical axis direction, and a projection of the auricle on the sagittal plane may have a dimension in a range of 45 mm to 55 mm in a sagittal axis direction. The projection of the auricle on the sagittal plane refers to a projection of an edge of the auricle on the sagittal plane. The edge of the auricular is composed of at least an outer contour of the helix, a contour of the earlobe, a contour of the tragus, an intertragic notch, an antitragic apex, an antihelix-antitragus notch, etc. Thus, in the present disclosure, the descriptions such as “worn by the user,” “in the wearing state,” and “under the wearing state” may refer to the earphone described in the present disclosure being worn on the ear of the aforementioned simulator. Of course, considering that different users have individual differences, the structure, shape, dimension, thickness, etc., of one or more parts of the ear 100 may be somewhat different. In order to meet the needs of different users, the earphone may be designed differently, and these differential designs may be manifested as feature parameters of one or more parts of the earphone (e.g., a sound production component, an ear-hook, etc., in the following descriptions) having different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the “front side of the ear” as described in the present disclosure refers to a side facing a facial region of the human body in a direction along the coronal axis of the human body. In this case, observing the ear of the above simulator in a direction along the coronal axis of the human body, a schematic diagram illustrating the front side of the ear as shown in FIG. 1 is obtained.

The description of the ear 100 above is provided for illustrative purposes and is not intended to limit the scope of the present disclosure. Those skilled in the art may make various changes and modifications based on the description of the present disclosure. For example, certain structures of the earphone may shield a portion or all of the external ear canal 101. These changes and modifications are still within the scope of protection of the present disclosure.

Figure 2:
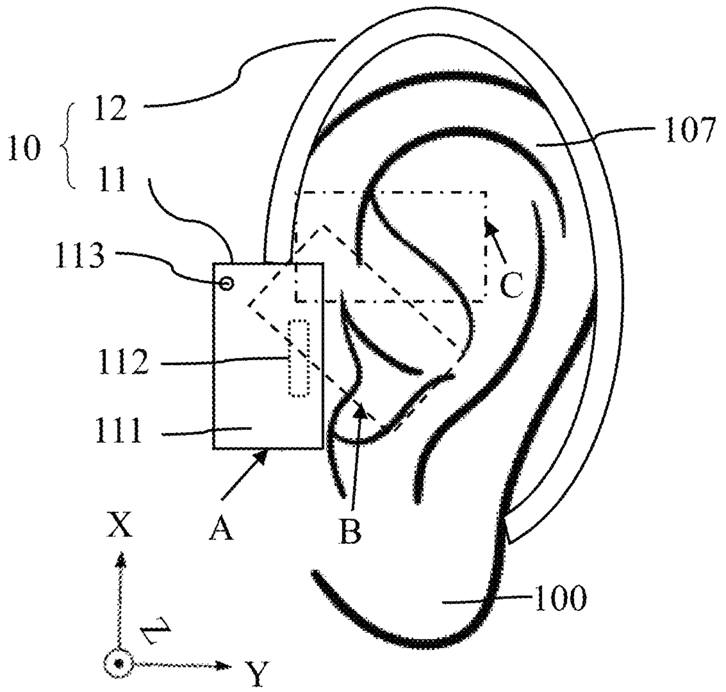
FIG. 2 is a schematic diagram illustrating an exemplary structure of an earphone according to some embodiments of the present disclosure.

FIG. 2 is a schematic diagram illustrating an exemplary structure of an earphone according to some embodiments of the present disclosure.

In some embodiments, the earphone 10 may include, but is not limited to, an air-conduction earphone, a bone air-conduction earphone, etc. In some embodiments, the earphone 10 may be combined with products such as glasses, a headset, a head-mounted display device, an AR/VR headset, etc.

As shown in FIG. 2, the earphone 10 may include a sound production component 11 and an ear-hook 12. The sound production component 11 may be worn on a user’s body, and the sound production component 11 may produce a sound that is input into an ear canal of the user. In some embodiments, the sound production component 11 may include a transducer (not shown in the figure) and a housing 111 for accommodating the transducer. The housing 111 may be coupled to ear-hook 12.

The transducer is used to convert an electrical signal into a corresponding mechanical vibration to generate the sound. The transducer is an element that can receive the electrical signal and convert the electrical signal into a sound signal for output. In some embodiments, classifying by frequency, the type of the transducer may include a low-frequency (e.g., 30 Hz-150 Hz) loudspeaker, a middle and low-frequency (e.g., 150 Hz-500 Hz) loudspeaker, a middle and high-frequency (e.g., 500 Hz-5 kHz) loudspeaker, a high-frequency (e.g., 5 kHz-16 kHz) loudspeaker, or a full range (e.g., 30 Hz-16 kHz) loudspeaker, or any combination thereof. The low-frequency and high-frequency mentioned here may only represent an approximate range of the frequency, and in different application scenarios, there may be different division methods. For example, a frequency division point may be determined, the low-frequency may represent a frequency range below the frequency division point, and the high-frequency may represent a frequency range above the frequency division point. The frequency division point may be any value within an audible range of the human ear, e.g., 500 Hz, 600 Hz, 700 Hz, 800 Hz, 1000 Hz, or the like. In some embodiments, a sound outlet 112 is provided on a side surface of the housing 111 toward an auricle, and the sound outlet 112 is used to conduct the sound generated by the transducer out of the housing 111 and then direct the sound to the ear canal, so as to enable the user to hear the sound. In some embodiments, the transducer may include a diaphragm, and the diaphragm separates the housing 111 into a front cavity and a rear cavity of the earphone. When the diaphragm vibrates, the sound may emanate from the front and rear sides of the diaphragm, respectively. The front cavity is acoustically coupled to the sound outlet 112, and a sound from the front side of the diaphragm may be transmitted to an ear canal through the front cavity from the sound outlet 112. In some embodiments, a portion of the sound exported through the sound outlet 112 may be transmitted to the ear canal thereby allowing the user to hear the sound, and another portion thereof may be transmitted with the sound reflected by the ear canal through a gap between the sound production component 11 and the ear (e.g., a portion of the cavum concha not covered by the sound production component 11) to the outside of the earphone 10 and the ear, thereby creating a first leakage sound in the far-field. At the same time, the housing 111 may be provided with one or more pressure relief holes 113 on one or more other side surfaces (e.g., a side surface that is away from or back away from the user's ear canal), and the pressure relief hole(s) 113 are acoustically coupled to the rear cavity. The pressure relief holes 113 are further away from the ear canal than the sound outlet 112, and the sound transmitted by the pressure relief holes 113 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other so that the aforementioned first leakage sound and the aforementioned second leakage sound can cancel each other out in the far-field, which is conducive to reducing the leakage of the earphone 10 in the far-field.

Different side surfaces described in the embodiments of the present disclosure (which may be combined with FIGS. 8, 9, 15, and 16) are: in a wearing state, the sound production component 11 may have an inner side surface IS (also referred to as an inner side surface of the housing 111) that faces the ear along a thickness direction Z, an outer side surface OS (also referred to as an outer side surface of the housing 111) that is back away from the ear, and a connection surface that connects the inner side surface IS and the outer side surface OS. It should be noted that in the wearing state, when viewed along a direction at which a coronal axis (i.e., the thickness direction Z) is located, the sound production component 11 may be provided in a shape of a circle, an oval, a rounded square, a rounded rectangle, etc. When the sound production component 11 is provided in a shape of a circle, an ellipse, or the like, the connection surface refers to a curved side surface of the sound production component 11; and when the sound production component 11 is provided in a shape of a rounded corner square, a rounded corner rectangle, or the like, the connection surface may include a lower side surface LS (also referred to as a lower side surface of the housing 111), an upper side surface US (also referred to as an upper side surface of the housing 111), and a rear side surface RS (also referred to as a rear side surface of the housing 111). The upper side surface US and the lower side surface LC may respectively refer to a side surface of the sound production component 11 along a short-axis direction Y that is away from the external ear canal 101 and a side surface of the sound production component along the short-axis direction Y that faces the external ear canal 101 in the waring state, and the rear side surface RS refers to a side surface of the sound production component 11 along a long-axis direction X that faces a rear of the head in the wearing state. For the sake of description, the present disclosure is exemplarily illustrated with the sound production component 11 set in a shape of a rounded rectangle. A length of the sound production component 11 along the long-axis direction X may be greater than a width of the sound production component 11 along the short-axis direction Y. In some embodiments, the rear side surface RS of the earphone may be curved to improve the aesthetics and comfort of the earphone.

One end of the ear-hook 12 may be connected to the sound production component 11 and the other end of the ear-hook 12 extends along a junction between the user's ear and head. In some embodiments, the ear-hook 12 may be an arc-shaped structure that is adapted to the user's auricle, so that the ear-hook 12 can be hung on the user's auricle. For example, the ear-hook 12 may have an arc-shaped structure adapted to the junction of the user's head and ear, so that the ear-hook 12 can be hung between the user's ear and head. In some embodiments, the ear-hook 12 may also be a clamping structure adapted to the user's auricle, so that the ear-hook 12 can be clamped at the user's auricle. Exemplarily, the ear-hook 12 may include a hook portion (e.g., the hook portion 121 shown in FIG. 3) and a connection portion (e.g., the connection portion 122 shown in FIG. 3) that are connected in sequence. The connection portion connects the hook portion to the sound production component 11 so that the earphone 10 is curved in the three-dimensional space when it is in a non-wearing state (i.e., in a natural state). In other words, in the three-dimensional space, the hook portion, the connection portion, and the sound production component 11 are not co-planar. In such cases, when the earphone 10 is in the wearing state, the hook portion may be primarily for hanging between a rear side of the user's ear and the head, and the sound production component 11 may be primarily for contacting a front side of the user's ear, thereby allowing the sound production component 11 and the hook portion to cooperate to clamp the ear. Exemplarily, the connection portion may extend from the head toward an outside of the head and cooperate with the hook portion to provide a compression force on the front side of the ear for the sound production component 11. The sound production component 11 may specifically be pressed against an area where a part such as the cavum concha 102, the cymba concha 103, the triangular fossa 104, the antihelix 105, etc., is located under the compression force so that the outer ear canal 101 of the ear is not obscured when the earphone 10 is in the wearing state.

In some embodiments, in order to improve the stability of the earphone 10 in the wearing state, the earphone 10 may be provided in any one of the following ways or a combination thereof. First, at least a portion of the ear-hook 12 is provided as a mimic structure that fits against at least one of the rear side of the ear 100 and the head to increase a contact area of the ear-hook 12 with the ear 100 and/or the head, thereby increasing the resistance of the earphone 10 to fall off from the ear 100. Second, at least a portion of the ear-hook 12 is provided with an elastic structure so that it has a certain degree of deformation in the wearing state to increase a positive pressure of the ear-hook 12 on the ear and/or the head, thereby increasing the resistance of the earphone 10 to fall off from the ear. Third, the ear-hook 12 is at least partially set to lean against the head in the wearing state, so that it forms a reaction force to press the ear to enable the sound production component 11 to be pressed on the front side of the ear, thereby increasing the resistance of the earphone 10 to fall off from the ear. Fourth, the sound production component 11 and the ear-hook 12 are set to clamp a region where the helix is located, a region where the cavum concha is located, etc., from the front and rear sides of the ear in the wearing state, so as to increase the resistance of the earphone 10 to fall off from the ear. Fifth, the sound production component 11 or an auxiliary structure connected thereto is set to extend at least partially into cavities such as the cavum concha, the cymba concha, the triangular fossa, and the scapha, so as to increase the resistance of the open earphone 10 to falling off from the ear.

In some embodiments, the ear-hook 12 may include, but is not limited to, an elastic band, etc., allowing the earphone 10 to be better fixed to the user and prevent the user from dropping it during use. In some embodiments, the earphone 10 may not include the ear-hook 12, and the sound production component 11 may be placed in the vicinity of the user's ear 100 using a hanging or clamping manner.

In some embodiments, the sound production component 11 may be, for example, circular, elliptical, runway-shaped, polygonal, U-shaped, V-shaped, semi-circular, or other regular or irregular shapes so that the sound production component 11 may be hung directly at the user's ear 100. In some embodiments, the sound production component 11 may have a long-axis direction X and a short-axis direction Y that are perpendicular to the thickness direction Z and orthogonal to each other. The long-axis direction X may be defined as a direction having the largest extension dimension in a shape of a two-dimensional projection plane (e.g., a projection of the sound production component 11 in a plane on which its outer side surface is located, or a projection on a sagittal plane) of the sound production component 11. For example, when the projection shape is rectangular or approximately rectangular, the long-axis direction is a length direction of the rectangle or approximately rectangle. The short-axis direction Y may be defined as a direction perpendicular to the long-axis direction X in the shape of the projection of the sound production component 11 on the sagittal plane. For example, when the projection shape is rectangular or approximately rectangular, the short-axis direction is a width direction of the rectangle or approximately rectangle. The thickness direction Z may be defined as a direction perpendicular to the two-dimensional projection plane, for example, in the same direction as a coronal axis, both pointing to the left-and-right side of the body.

In some embodiments, when the user wears the earphone 10, the sound production component 11 may be placed in a position near but not blocking the external ear canal 101 of the user. In some embodiments, the projection of the earphone 10 on the sagittal plane may not cover the user's ear canal while in the wearing state. For example, the projection of the sound production component 11 on the sagittal plane may fall on the left and right sides of the head and be located at the front side of the tragus in the sagittal axis of the body (e.g., at the position shown in dashed box A in FIG. 2). In this case, the sound production component 11 is located at the front side of the tragus of the user, the long-axis of the sound production component 11 may be in a vertical or approximately vertical position, the projection of the short-axis direction Y on the sagittal plane is in the same direction as the sagittal axis, the projection of the long-axis direction X on the sagittal plane is in the same direction as a vertical axis, and the thickness direction Z is perpendicular to the sagittal plane. As another example, the projection of the sound production component 11 on the sagittal plane may fall on the antihelix 105 (e.g., at the position shown in the dashed box C in FIG. 2). In this case, the sound production component 11 is at least partially located at the antihelix 105, the long-axis of the sound production component 11 is horizontal or approximately horizontal, the projection of the long-axis direction X of the sound production component 11 on the sagittal plane is in the same direction as the sagittal axis, the projection of the short-axis direction Y on the sagittal plane is in the same direction as the vertical axis and the thickness direction Z is perpendicular to the sagittal plane. In this way, it is possible to avoid the sound production component 11 from blocking the ear canal, thereby freeing the user's ears. It is also possible to increase the contact area between the sound production component 11 and the ear 100, thus improving the wearing comfort of the earphone 10. In some embodiments, in the wearing state, the projection of the earphone 10 on the sagittal plane may also cover or at least partially cover the user's ear canal, for example, the projection of the sound production component 11 on the sagittal plane may fall within the cavum concha 102 (e.g., at the position shown in the dashed box B in FIG. 2) and be in contact with the helix foot 1071 and/or the helix 107. At this point, the sound production component 11 is at least partially located in the cavum concha 102; the sound production component 11 is in an inclined state; the projection of the short-axis direction Y of the sound production component 11 on the sagittal plane may have an angle with the direction of the sagittal axis, i.e., the short-axis direction Y is also set at a corresponding inclination; the projection of the long-axis direction X on the sagittal plane may have an angle with the direction of the sagittal axis, i.e., the long-axis direction X is also set at an inclination; and the thickness direction Z is perpendicular to the sagittal plane. At this point, since the cavum concha 102 has a certain volume and depth, the open earphone 10 has a certain distance between the inner side surface IS and the cavum concha. The ear canal may be communicated with the outside world through the gap between the inner side surface IS and the cavum concha, thus freeing both ears of the user. At the same time, the sound production component 11 and the cavum concha may cooperate to form an auxiliary cavity (e.g., a cavity structure as mentioned later) that is communicated with the ear canal. In some embodiments, the sound outlet 112 may be at least partially located in the aforementioned auxiliary cavity, and the sound exported from the sound outlet 112 is limited by the aforementioned auxiliary cavity, i.e., the aforementioned auxiliary cavity is able to gather the sound, allowing the sound to propagate more into the ear canal, thereby improving the volume and quality of the sound heard by the user in the near-field, and improving the acoustic effect of the earphone 10.

The description of the above-mentioned earphone 10 is for the purpose of illustration only and is not intended to limit the scope of the present disclosure. Those skilled in the art can make various changes and modifications based on the description of this present disclosure. For example, the earphone 10 may also include a battery assembly, a Bluetooth assembly, etc., or a combination thereof. The battery assembly may be used to power the earphone 10. The Bluetooth assembly may be used to wirelessly connect the earphone 10 to other devices (e.g., a cell phone, a computer, etc.). These variations and modifications remain within the scope of protection of the present disclosure.

Figure 3:
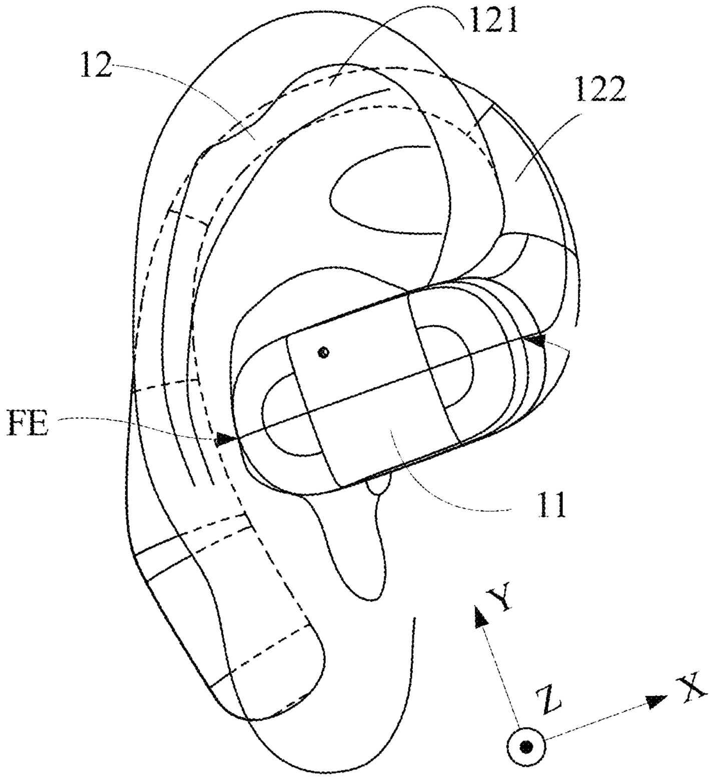
FIG. 3 is a schematic diagram illustrating a sound production component of an earphone extending into a cavum concha according to some embodiments of the present disclosure.

FIG. 3 is a schematic diagram illustrating a sound production component of an earphone extending into a cavum concha according to some embodiments of the present disclosure.

As shown in FIG. 3, in the wearing state, an end FE (also referred to as a free end) of the sound production component 11 may extend into the cavum concha. Optionally, the sound production component 11 and the ear-hook 12 may be set up to, from the front and rear sides of an ear region corresponding to the cavum concha, co-clamp the ear region, thereby increasing the resistance of the earphone 10 falling off from the ear region and improving stability of the earphone 10 in the wearing state. For example, the end FE of the sound production component is pressed and held within the cavum concha along the thickness direction Z. Furthermore, for example, the end FE is pressed against within the cavum concha along the long-axis direction X and/or the short-axis direction Y (e.g., which abuts against an inner wall of the cavum concha opposite to the end FE). It should be noted that the end FE of the sound production component 11 refers to an end of the sound production component 11 opposite to a fixed end connected to the ear-hook 12, which is also referred to as the free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the fixed end connected to the ear-hook 12 in the sound production component 11. As another example, when the sound production component 11 is a sphere, an ellipsoid, or an irregular structure, the end FE of the sound production component 11 may be a specific region away from the fixed end obtained by cutting the sound production component 11 along a X-Y plane. A ratio of a size of the specific region along the long-axis direction X to the size of the sound production component along the long-axis direction X may be within a range of 0.05-0.2.

By extending at least part of the sound production component 11 into the cavity of the auricular concha, the listening volume at the listening position (e.g., at the opening of the ear canal), especially the listening volume at the middle and low frequencies, may be improved, while still maintaining the good effect of far-field sound leakage cancellation. Merely by way of example, when the whole or part of the structure of the sound production component 11 extends into the cavity of auricular concha 102, the sound production component 11 and the cavity of auricular concha 102 may form a structure similar to a cavity (hereinafter referred to as a cavity-like structure). In the embodiments of the disclosure, the cavity-like structure may be understood as a semi-closed structure enclosed by the sidewall of the sound production component 11 and the cavity of auricular concha 102. The semi-closed structure may make the listening position (e.g., the opening of the ear canal) not completely sealed off from the external environment, but have a leaking structure (e.g., an opening, a gap, a tube, etc.) in acoustic communication with the external environment. When the user wears the earphone 10, one or more sound outlets may be disposed on a side of the housing 111 of the sound production component 11 near or toward the ear canal of the user. One or more pressure relief holes may be disposed on the other sidewalls (e.g., sidewalls away from the ear canal of the user) of the housing 111 of the sound production component 11. The sound outlet may be acoustically coupled with a front cavity of the earphone 10, and the pressure relief hole may be acoustically coupled with a rear cavity of the earphone 10. Taking the sound production component 11 including one sound outlet and one pressure relief hole as an example, the sound output from the sound outlet and the sound output from the pressure relief hole may be approximately regarded as two sound sources. Sound phases of the two sound sources may be opposite to form a dipole.

Figure 4:
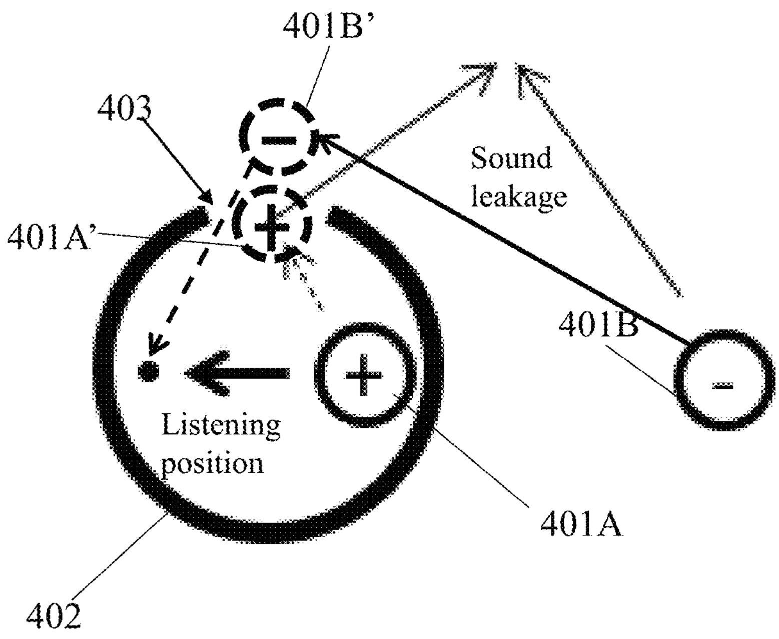
FIG. 4 is a schematic diagram illustrating an exemplary acoustic model of a cavity-like structure according to some embodiments of the present disclosure.

Inner walls corresponding to the sound production component 11 and the cavity of auricular concha 102 may form the cavity-like structure, wherein the sound source corresponding to the sound outlet may be located in the cavity-like structure, and the sound source corresponding to the pressure relief hole may be located outside the cavity-like structure, forming an acoustic model shown in FIG. 4. FIG. 4 is a schematic diagram illustrating an exemplary acoustic model of a cavity-like structure according to some embodiments of the present disclosure. As shown in FIG. 4, the cavity-like structure 402 may include a listening position and at least one sound source 401A. The "include" here may mean that at least one of the listening position and the sound source 401A is located inside the cavity-like structure 402, and may also mean that at least one of the listening position and the sound source 401A is located at an inner edge of the cavity-like structure 402. The listening position may be equivalent to the opening of the ear canal, an acoustic reference point of the ear, such as ERP, DRP, etc., or an entrance structure leading to the listener, etc. The sound source 401B may be located outside the cavity-like structure 402. The sound sources 401A and 401B with anti-phases may form a dipole. The dipole may respectively radiate sound to the surrounding space and produce the phenomenon of interference and cancellation of sound waves, thereby realizing the effect of sound leakage cancellation. As the sound path difference between the two sounds is relatively large at the listening position, the effect of sound cancellation may be relatively insignificant, and a relatively large sound may be heard at the listening position than at other positions. Specifically, as the sound source 401A is surrounded by the cavity-like structure 402, most of the sound radiated from the sound source 401A may reach the listening position through direct radiation or reflection. In contrast, most of the sound radiated from the sound source 401A may not reach the listening position without the cavity-like structure 402. Therefore, the arrangement of the cavity-like structure 402 may significantly increase the sound volume reaching the listening position. Meanwhile, only a small part of anti-phase sound radiated from an anti-phase sound source 401B outside the cavity-like structure 402 may enter the cavity-like structure 402 through the leaking structure 403 of the cavity-like structure 402. This may be equivalent to generating a secondary sound source 401B' at the leaking structure 403, of which the intensity may be significantly smaller than the sound source 401B and also be significantly smaller than the sound source 401A. The sound produced by the secondary sound source 401B' may have a weak anti-phase cancellation effect on the sound source 401A in the cavity, which may significantly increase the listening volume at the listening position. For sound leakage, the sound source 401A may radiate sound to the outside through the leaking structure 403 of the cavity, which may be equivalent to generating the secondary sound source 401A' at the leaking structure 403 As almost all the sound radiated by the sound source 401A comes from the leaking structure 403, and a scale of the cavity-like structure 402 is much smaller than the spatial scale of evaluating sound leakage (the difference is at least one order of magnitude), it can be considered that the intensity of the secondary sound source 401A' may be equivalent to that of the sound source 401A. For the external space, the sound cancellation effect produced by the secondary sound source 401A' and the sound source 401B may be equivalent to the sound cancellation effect produced by the sound source 401A and the sound source 401B. That is to say, a considerable sound leakage reduction effect may still be maintained under the cavity-like structure.

In a specific application scenario, the outer wall of the housing of the sound production component 11 may usually be a plane or a curved surface, while the contour of the cavity of the auricular concha of the user may be an uneven structure. By extending part or the whole structure of the sound production component 11 into the cavity of the auricular concha, the sound production component 11 and the contour of the cavity of the auricular concha may form the cavity-like structure that communicates with the outside world. Further, the sound outlet may be arranged on the housing of the sound production component toward the opening of the ear canal of the user and near the edge of the cavity of the auricular concha, and the pressure relief hole may be arranged at the position where the sound production component 11 deviates from or is away from the opening of the ear canal, to construct the acoustic model shown in FIG. 4, so as to improve the listening volume at the opening of the ear canal when wearing the earphone, and reduce the far-field leakage effect.

Figure 5A:
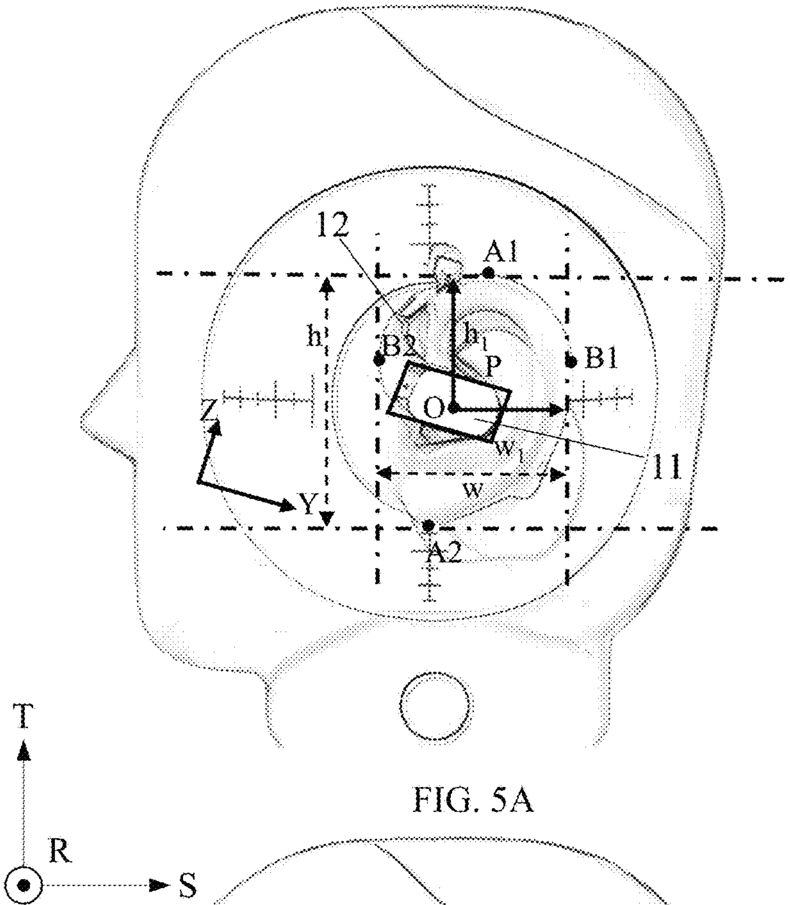
FIG. 5A and FIG. 5B are schematic diagrams illustrating an exemplary wearing state of an earphone according to some embodiments of the present disclosure.
Figure 5B:
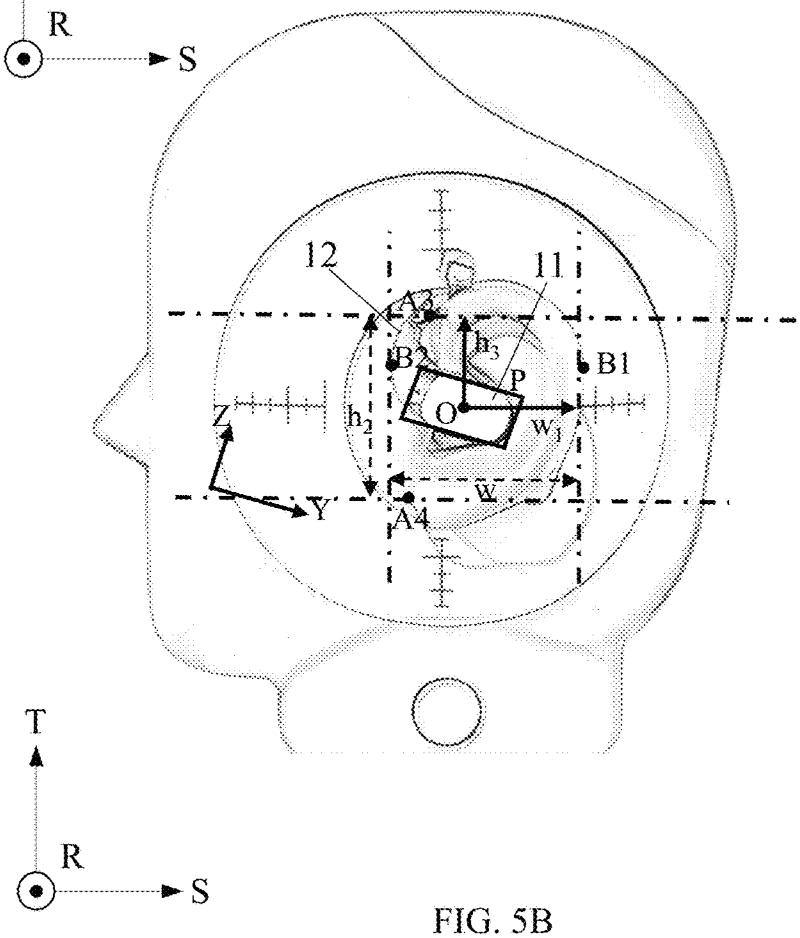

FIG. 5A and FIG. 5B are schematic diagrams illustrating an exemplary wearing state of an earphone according to some embodiments of the present disclosure.

Referring to FIG. 3 and FIG. 5A, in some embodiments, when the user wears the earphone 10, the sound production component 11 may have a first projection on a sagittal plane (i.e., a plane formed by a T-axis and an S-axis in FIG. 5A) along a coronal axis direction R. A shape of the sound production component 11 may be a regular or irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be irregular shape, for the convenience of describing the first projection, a rectangular region shown in a solid line box P may be delineated around the projection (i.e., the first projection) of the sound production component 11 in FIG. 5A and FIG. 5B, and a centroid O of the rectangular region shown by the solid line box P may be approximately regarded as the centroid of the first projection. It should be noted that the above description about the first projection and the centroid thereof is only an example, and the shape of the first projection is related to the shape of the sound production component 11 or the wearing condition relative to the ear. The confirmation process of the solid line box P may be as follows: two farthest points of the sound production component 1 in the long-axis direction X may be determined, and a first line segment and a second line segment parallel to the short-axis direction Y through these two farthest points may be drawn, respectively; two farthest points of the sound production component 11 in the short-axis direction Y may be determined, a third line segment and a fourth line segment parallel to the long-axis direction X through these two farthest points may be drawn, and the rectangular region of the solid line box P in FIG. 5A and FIG. 5B may be obtained by a region formed by the above line segments.

In some embodiments, the auricle has a second projection on the sagittal plane along the coronal axis direction R. The second projection has a highest point, a lowest point, an end point, a front end point, a height along a vertical axis direction, and a width along a sagittal axis direction. The highest point of the second projection may be understood as a point with a largest distance in the vertical axis direction relative to the projection of a certain point on the neck of the user on the sagittal plane among all the projection points, i.e., a projection of the highest point of the auricle (e.g., point A1 in FIG. 5A) on the sagittal plane may be the highest point of the second projection. A lowest point of the second projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 5A) on the sagittal plane may be the lowest point of the second projection. A height of the second projection in the vertical axis direction may be a difference (height h shown in FIG. 5A) between the point with the largest distance and the point with the smallest distance in the vertical axis direction and the smallest point of the projection relative to a projection of a certain point of the neck of the user on the sagittal plane among all the projection points in the second projection, i.e., the distance between point A1 and point A2 in the vertical axis direction T. The end point of the second projection may be understood as a point with the largest distance in the sagittal axis direction relative to the projection of the nose tip of the user on the sagittal plane among all the projection points, i.e., the projection of the end point of the auricle (e.g., point B1 in FIG. 5A) on the sagittal plane may be the end point of the second projection. The front end point of the second projection may be understood as a point with the smallest distance in the sagittal axis direction relative to the projection of the nose tip of the user on the sagittal plane among all projection points, i.e., the projection of the front end point of the auricle (e.g., point B2 shown in FIG. 5A) on the sagittal plane may be the front end point of the second projection. The width of the second projection in the sagittal axis direction may be a difference (the width w shown in FIG. 5A) between the point with the largest distance and the point with the smallest distance along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

In some embodiments, in order to allow at least apart of the sound production component 11 to extend into the cavum concha when the earphone 10 is in the wearing state, in some embodiments, a ratio of a distance $h_1$ (also referred to as a first distance) between the centroid O of the first projection and the highest point of the second projection along the vertical axis direction (e.g., a T-axis direction shown in FIG. 5A) to the height h of the second projection along the vertical axis direction may be between 0.35 and 0.6. At this time, the sound production component 11 of the earphone 10 and the cavum concha may form an acoustic model as shown in FIG. 4, so that a listening volume of the earphone 10 at a listening position (e.g., at an ear canal opening) may be increased, in particular in a middle and low-frequency, and the good far-field sound leakage cancellation effect can be maintained. In some embodiments, to further improve the listening effect of the earphone at the listening position and the effect of far-field sound leakage cancellation, a position of a sound outlet and a pressure relief hole on the housing 111 may be set up. For example, when a leaking structure formed by the sound production component 11 and the cavum concha is in a different position on the ear (e.g., at an upper side of the ear, and at a lower side of the ear), the sound outlet and the pressure relief hole are in different positions on the housing 111.

It should also be noted that an area of the first projection of the sound production component 11 on the sagittal plane may be generally much smaller than an area of a projection of the auricle on the sagittal plane, to ensure that the opening of the ear canal of the user may not be blocked when the user wears the earphone 10, and the load on the user when wearing the earphone may be reduced, which is convenient for the user to carry daily. On this premise, in the wearing state, when the ratio of the distance h1 between the centroid O of the projection (the first projection) of the sound production component 11 on the sagittal plane and the projection (the highest point of the second projection) of the highest point A1 of the auricle on the sagittal plane in the vertical axis direction to the height h of the second projection in the vertical axis direction is too small or too large, part of the structure of the sound production component 11 may be located above the top of the auricle or at the earlobe of the user, which may be impossible to use the auricle to sufficiently support and limit the sound production component 11, and there may be a problem that the wearing is unstable and easy to fall off. On the other hand, when the ratio of $h_1$ to h is too small or too large, it may also cause the sound outlet set on the sound production component 11 to be away from the opening of the ear canal, affecting the listening volume at the opening of the ear canal of the user. In order to ensure that the earphone does not block the opening of the ear canal of the user and ensure the stability and comfort of the user wearing the earphone and a good listening effect, in some embodiments, the ratio of the distance h1 between the centroid O of the first projection and the highest point A1 of the second projection in the vertical axis direction to the height h of the second projection in the vertical axis direction may be controlled to be within a range of 0.35-0.6, so that when part or the whole structure of the sound production component extends into the cavity of the auricular concha, the force exerted by the cavity of auricular concha on the sound production component 11 may support and limit the sound production component 11 to a certain extent, thereby improving the wearing stability and comfort of the earphone. Meanwhile, the sound generating part 11 may also form the acoustic model shown in FIG. 4 with the cavity of auricular concha, to ensure the listening volume of the user at the listening position (e.g., the opening of the ear canal) and reduce the far-field leakage volume. Preferably, the ratio of the distance h1 between the centroid O of the first projection and the highest point A1 of the second projection in the vertical axis direction to the height h of the second projection in the vertical axis direction may be controlled to be within a range of 0.35-0.55. More preferably, the ratio of the distance h1 between the centroid O of the first projection and the highest point of the second projection in the vertical axis direction to the height h of the second projection in the vertical axis direction may be controlled to be within a range of 0.4-0.5.

As a specific example, the height h of the second projection along the vertical axis direction may be 55 mm to 65 mm, and in the wearing state, if the distance $h_1$ between the centroid O of the first projection and the highest point of the second projection on the sagittal plane along the vertical axis direction is less than 15 mm or greater than 50 mm, the sound production component 11 may be located farther away from the cavum concha, which not only fails to construct the acoustic model shown in FIG. 4, but also leads to unstable wearing. Therefore, in order to ensure the acoustic output effect of the sound production component and the wearing stability of the earphone, the distance $h_1$ between the centroid O of the first projection and the highest point of the second projection along the vertical axis direction may be controlled to be in a range of 15 mm to 50 mm.

Figure 6:
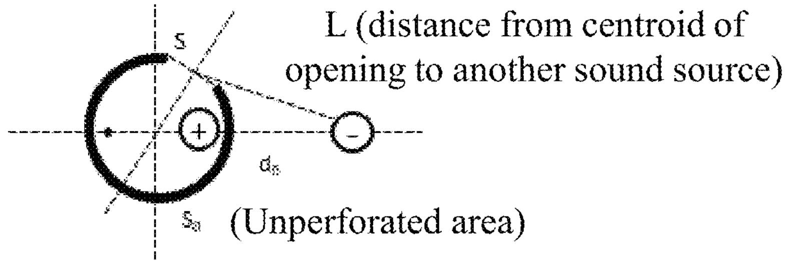
FIG. 6 is a schematic diagram illustrating an exemplary structure of the cavity-like structure according to some embodiments of the present disclosure.
Figure 7:
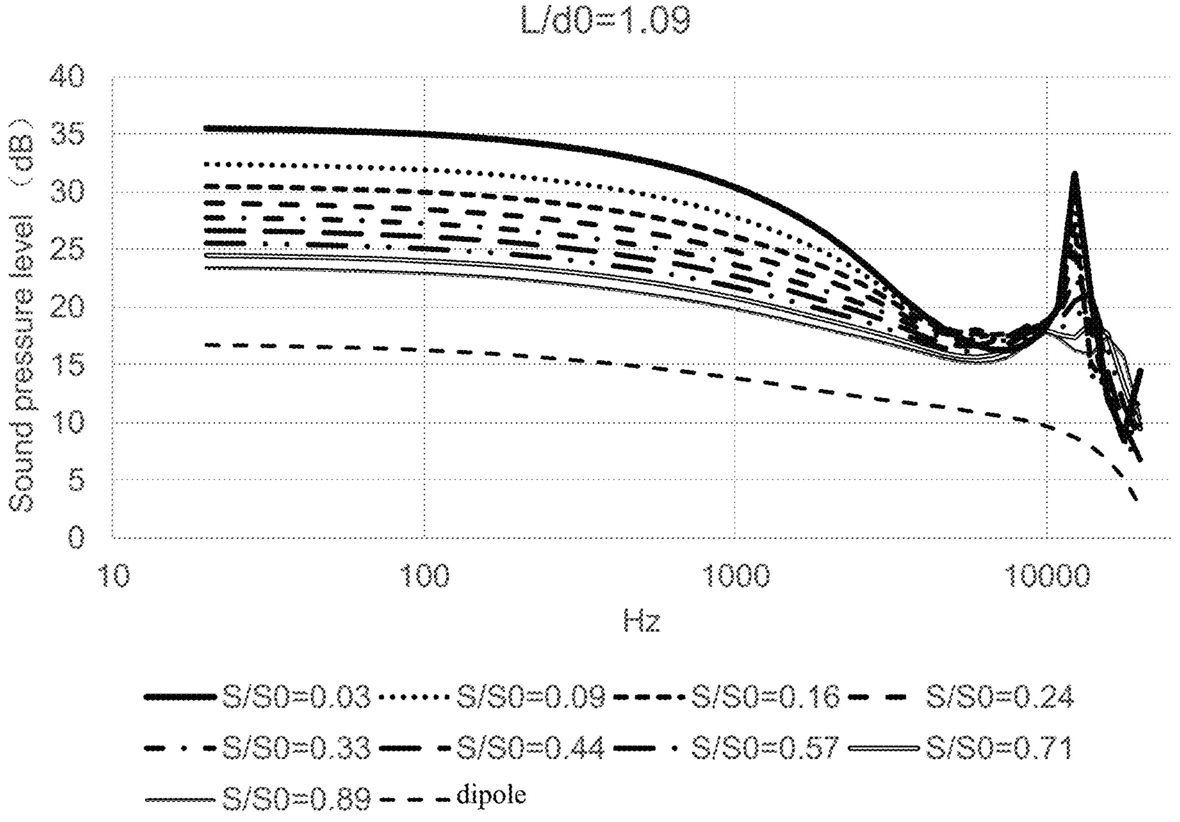
FIG. 7 is a diagram illustrating a sound listening index of the cavity-like structure with a leaking structure of different sizes according to some embodiments of the present disclosure.

As mentioned above, when the user wears the earphone 10, at least part of the sound production component 11 may extend into the cavity of auricular concha of the user to form the acoustic model in FIG. 4. The outer wall surface of the housing of the sound production component 11 may usually be the plane or the curved surface, and the contour of the cavity of auricular concha of the user may be the uneven structure. When the part or whole structure of the sound production component 11 extends into the cavity of the auricular concha, a gap may be formed as the sound production component 11 cannot be closely fit with the cavity of the auricular concha. The gap may correspond to the leaking structure 403 in FIG. 4. FIG. 6 is a schematic diagram illustrating a cavity-like structure according to some embodiments of the present disclosure. FIG. 7 is a graph illustrating listening indices of cavity-like structures with leaking structures of different sizes according to some embodiments of the present disclosure. As shown in FIG. 6, an opening area of the leaking structure on the cavity-like structure may be represented as S, and an area of the cavity-like structure directly affected by a contained sound source (e.g., "+" shown in FIG. 6) may be represented as S0. The "directly affected" here means that the sound emitted by the contained sound source may directly acoustically act on a wall of the cavity-like structure without passing through the leaking structure. A distance between two sound sources is d0, and a distance from a center of an opening shape of the leaking structure to another sound source (e.g., "−" in FIG. 6) is L. As shown in FIG. 7, keeping L/d0=1.09 constant, the larger the relative opening size S/S0, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, considering that the relative position of the sound production component 11 and the ear canal of the user (e.g., the cavity of auricular concha) may affect a size of the gap formed between the sound production component 11 and the cavity of auricular concha, e.g., when the end FE of the sound production component 11 abuts against the cavity of auricular concha, the size of the gap may be relatively small, and when the end FE of the sound production component 11 does not abut against the cavity of the auricular concha, the size of the gap may be relatively large. The gap formed between the sound production component 11 and the cavity of auricular concha may be referred to as the leaking structure in the acoustic model in FIG. 4. The relative position of the sound production component 11 and the ear canal of the user (e.g., the cavity of auricular concha) may affect a count of the leaking structure of the cavity-like structure formed by the sound production component 11 and the cavity of auricular concha and the opening size of the leaking structure, and the opening size of the leaking structure may directly affect the listening quality. Specifically, the larger the opening of the leaking structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the cavity of auricular concha of the user. Correspondingly, the ratio of the distance h1 between the centroid O of the first projection and the highest point of the second projection in the vertical axis direction to the height h of the second projection in the vertical axis direction may be controlled to be within a range of 0.35-0.6.

Preferably, in some embodiments, in order to improve the wearing comfort of the earphone while ensuring the acoustic output quality of the sound production component 11, the ratio of the distance h1 between the centroid O of the first projection and the highest point of the second projection in the vertical axis direction to the height h of the second projection in the vertical axis direction may be within a range of 0.35-0.55. More preferably, the ratio of the distance h1 between the centroid O of the first projection and the highest point of the second projection in the vertical axis direction to the height h of the second projection in the vertical axis direction may be within a range of 0.35-0.5.

In some embodiments, considering that there may be certain differences in the shape and size of the ears of different users, the ratio range may fluctuate within a certain range. For example, when the earlobe of the user is long, the height h of the second projection in the vertical axis direction may be larger than that of the general situation. At this time, when the user wears the earphone 100, the ratio of the distance h1 between the centroid O of the first projection and the highest point of the second projection in the vertical axis direction to the height h of the second projection in the vertical axis direction may be smaller, e.g., which may be within a range of 0.2-0.55. The ears of different users are different. For example, some users have longer earlobes. At this time, it may have an effect if the earphone 10 is defined using the ratio of the distance between the centroid O of the first projection and the highest point of the second projection to the height of the second projection on the vertical axis. As shown in FIG. 5B, a highest point A3 and a lowest point A4 of a connection region between the auricle of the user and the head of the user may be selected for illustration. The highest point of the connection part between the auricle and the head may be understood as a position where the projection of the connection region of the auricle and the head on the sagittal plane has a largest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the cavity of the auricular concha of the user. Correspondingly, a ratio of a distance h3 between the centroid O of the first projection and a highest point of a projection of the connection region of the auricle and the head on the sagittal plane in the vertical axis direction to a height h2 between a highest point and a lowest point of the projection of the connection region of the auricle and the head on the sagittal plane in the vertical axis direction may be controlled to be within a range of 0.4-0.65. Preferably, in some embodiments, in order to improve the wearing comfort of the earphone while ensuring the acoustic output quality of the sound production component 11, the ratio of the distance h3 between the centroid O of the first projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be controlled to be within a range of 0.45-0.6. More preferably, the ratio of the distance h3 between the centroid O of the first projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be within a range of 0.5-0.6.

Figure 8:
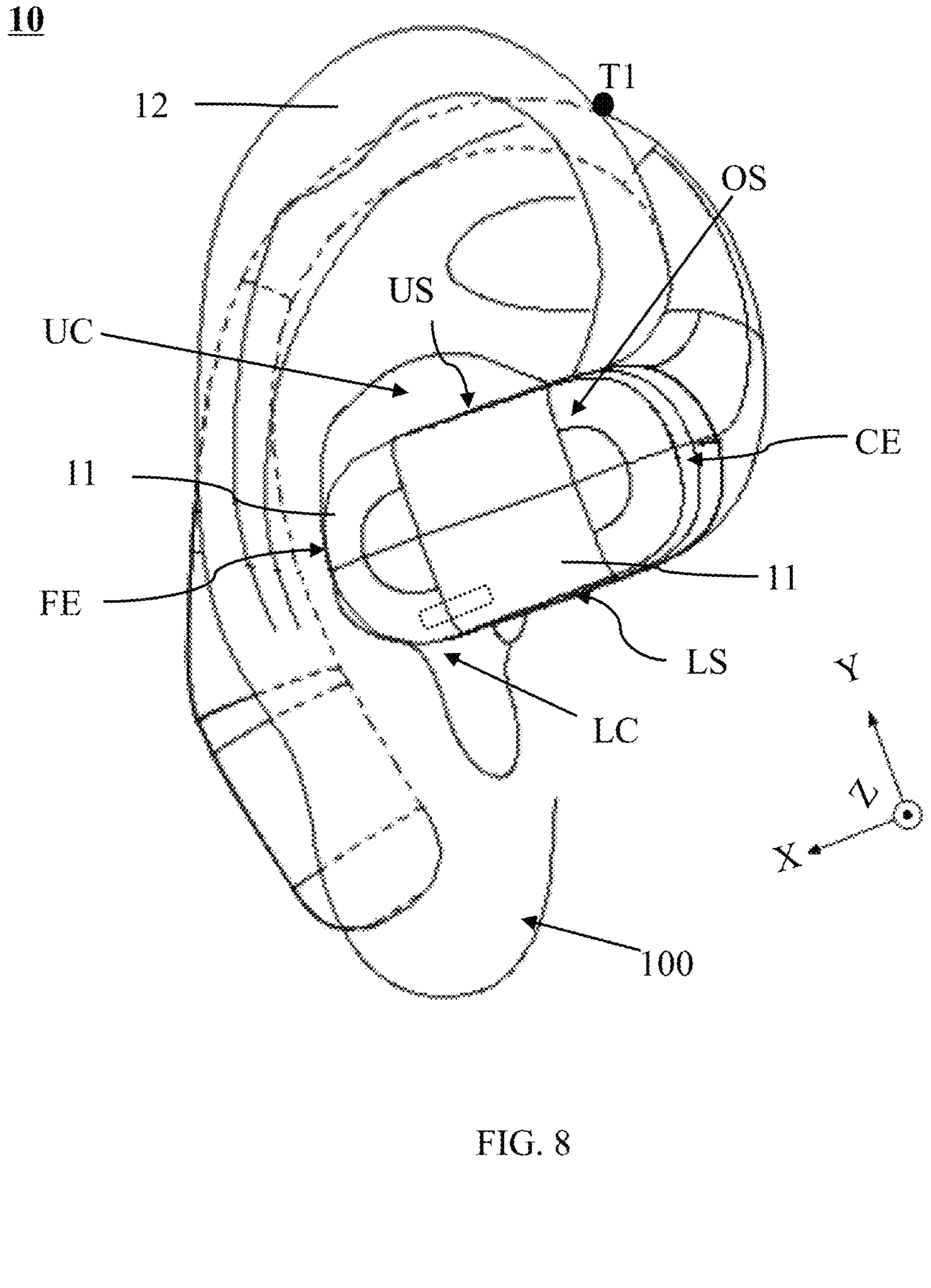
FIG. 8 is a schematic diagram illustrating a wearing state of an earphone according to some embodiments of the present disclosure.
Figure 9:
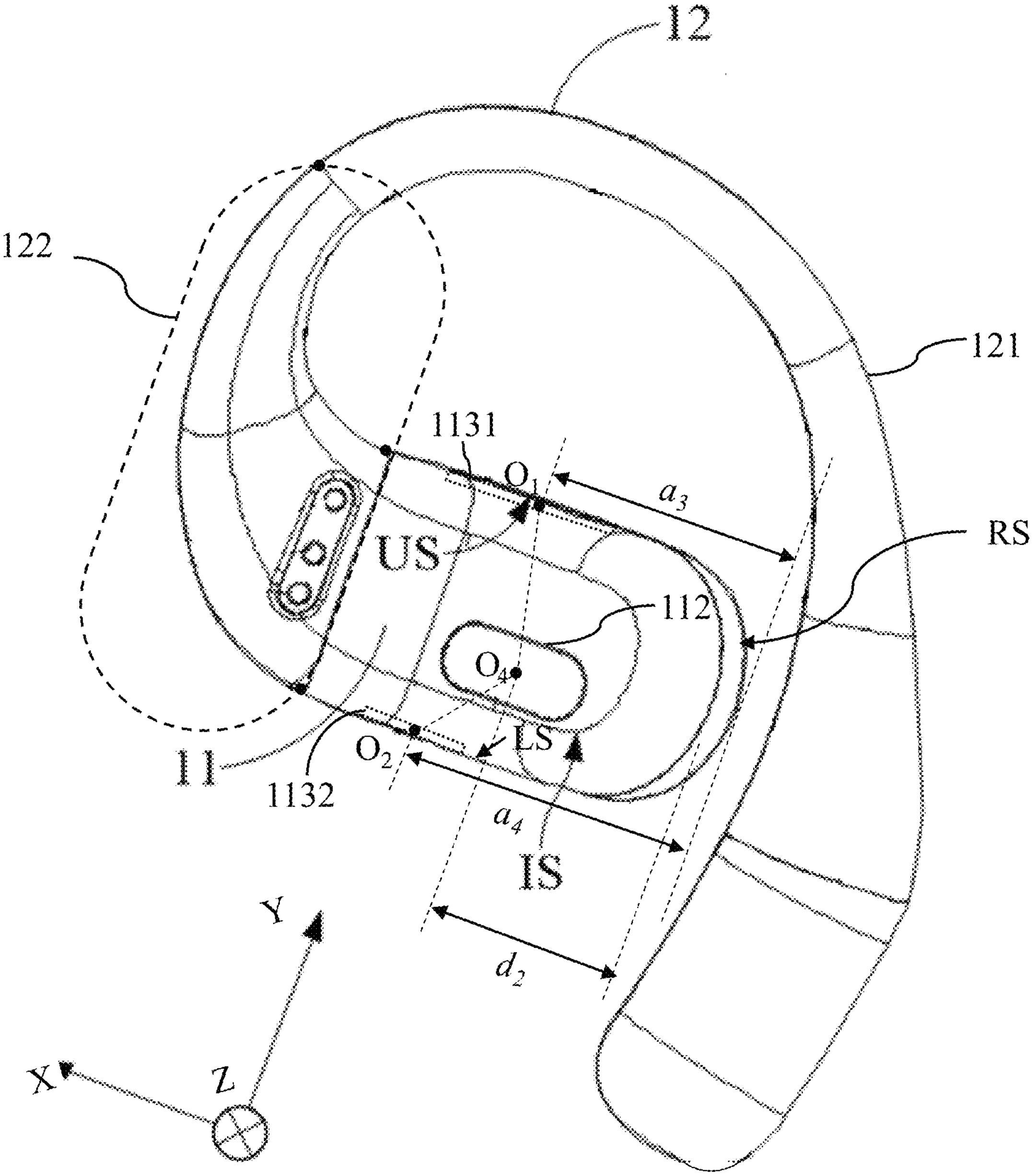
FIG. 9 is a schematic diagram illustrating a structure of an open earphone shown in FIG. 8 facing an ear.

FIG. 8 is a schematic diagram illustrating a wearing state of an open earphone according to some embodiments of the present disclosure. FIG. 9 is a schematic diagram illustrating a structure of an earphone shown in FIG. 8 facing an ear.

Referring to FIG. 8 and FIG. 9, in some embodiments, an inner side surface IS of the sound production component 11 may be provided with the sound outlet 112 that communicates with a front cavity to transmit a sound produced by the front cavity out of the housing 111 and then to an ear canal, so as to enable a user to hear the sound. One or more other side surfaces of the housing 111 (e.g., an outer side surface OS, an upper side surface US, or a lower side surface LS, etc.) may be provided with one or more pressure relief holes 113 communicated with a rear cavity for conducting the sound generated in a rear cavity out of the housing 111 to interfere with the sound out of the sound outlet 112 in a far-field. In some embodiments, the pressure relief hole 113 is farther away from the ear canal than the sound outlet 112, so as to weaken the inverse phase cancellation between the sound output via the pressure relief holes 113 and the sound output via the sound outlet 112 at the listening position (e.g., the ear canal), thereby increasing a sound volume at the listing position.

When a user wears the earphone 10, the housing 111 of the sound production component 11 is provided to be at least partially extended into the cavum concha 103, and a cavity jointly surrounded by the inner side surface IS and the cavum concha 103 of the sound production component 11 may be regarded as a cavity-like structure 402 as shown in FIG. 4, a gap is formed between the inner side surface IS and the cavum concha (e.g., a first leaking structure UC formed between the inner side surface IS and the cavum concha that is proximate to a top of the head and/or a second leaking structure LC formed between the inner side surface IS and the ear that is proximate to the ear canal) may be regarded as the leaking structure 403 as shown in FIG. 4. The sound outlet 112 provided on the inner side surface IS may be regarded as a point sound source inside the cavity-like structure 402 as shown in FIG. 4, and the pressure relief hole 113 (e.g., the first pressure relief hole 1131 or the second pressure relief hole 1132) may be considered as a point sound source outside the cavity-like structure 402 as shown in FIG. 4. Thus, when the earphone 10 is worn in a wearing manner in which the housing 111 is at least partially extended into the cavum concha, i.e., in a wearing manner as shown in FIG. 8, in terms of the listening effect, most of the sound radiated from the sound outlet 112 may reach the ear canal by the direct emission or reflection manner, which may result in a significant increase in the volume of the sound reaching the ear canal, especially the listening volume of the low and middle frequencies. At the same time, only a relatively small portion of the inversion sound radiated from the pressure relief hole 113 may enter the cavum concha through the slit (the first leaking structure UC and/or the second leaking structure LC), which has a weak inversion cancellation effect with the sound outlet 112, thereby making the listening volume of the ear canal significantly improved. In terms of the sound leakage effect, the sound outlet 112 may output sound to the outside world through the slit and the sound may cancel out the sound generated by the pressure relief hole 113 in the far-field, thus ensuring the sound leakage reduction effect.

In some embodiments, in order to enable the sound production component 11, when at least partially extended into the cavum concha, to form the first leaking structure and/or the second leaking structure with the cavum concha as described elsewhere in the present disclosure, a dimension of the sound production component 11 along a Y-direction may be based on a dimension of the cavum concha. At this point, when a distance from the sound outlet 112 to the bottom surface of a transducer is certain, a volume of the rear cavity may be related to an area of the upper side surface US and/or the lower side surface LS of the sound production component 11. In order to make the resonance frequency of the rear cavity sufficiently high, a ratio of an area of the pressure relief hole 113 to the volume of the rear cavity cannot be too small, in other words, the ratio of the area of the pressure relief hole 113 to the area of the upper side surface US and/or the lower side surface LS cannot be too small. In addition, in order to ensure the stability of the physical structure of the housing 111, and thus ensure the service life of the earphone 10, the ratio of the area of the pressure relief hole 113 to the area of the upper side surface US and/or the lower side surface LS cannot be too large. In some embodiments, the ratio of the area of the pressure relief hole 113 to the area of the upper side surface US is in a range of 0.036 to 0.093, or the ratio of the area of the pressure relief hole 113 to the area of the lower side surface LS is in a range of 0.018 to 0.051. In some embodiments, the ratio of the area of the pressure relief hole 113 to the area of the upper side surface US is in a range of 0.046 to 0.083, or the ratio of the area of the pressure relief hole 113 to the area of the lower side surface LS is in a range of 0.028 to 0.041. In some embodiments, the ratio of the area of the pressure relief hole 113 to the area of the upper side surface US is in a range of 0.056 to 0.073, or the ratio of the area of the pressure relief hole 113 to the area of the lower side surface LS is in a range of 0.031 to 0.038. In some embodiments, the ratio of the area of the pressure relief hole 113 to the area of the upper side surface US is in a range of 0.061 to 0.068, or the ratio of the area of the pressure relief hole 113 to the area of the lower side surface LS is in a range of 0.033 to 0.036.

Figure 10:
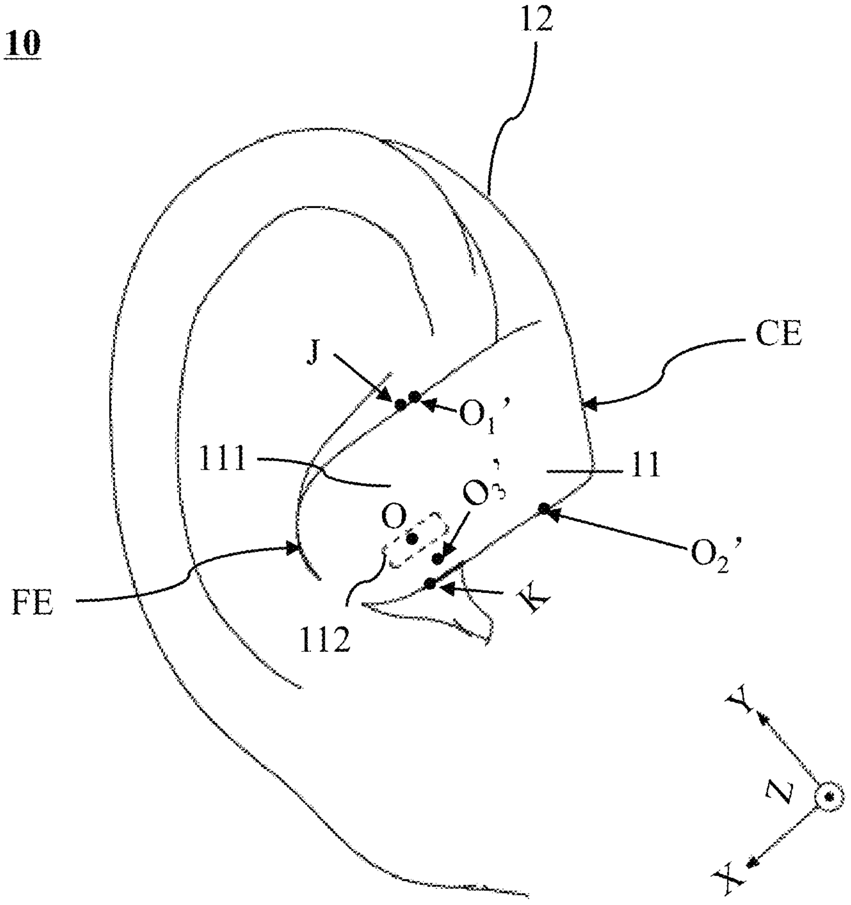
FIG. 10 is a schematic diagram illustrating a projection of an earphone on a sagittal plane when the earphone is in a wearing state according to some embodiments of the present disclosure.

FIG. 10 is a schematic diagram illustrating a projection of an earphone on a sagittal plane when the earphone is in a wearing state according to some embodiments of the present disclosure.

In some embodiments, referring to FIG. 8 and FIG. 10, in order to make the sound production component 11 stably worn on the ear of the user and to facilitate the construction of the cavity-like structure as shown in FIG. 4, and to make the cavity-like structure have at least one leaking structure, the free end FE may be pressed against the cavum concha in the long-axis direction X and the short-axis direction Y. At this time, the inner side surface IS of the sound production component 11 is inclined with respect to the sagittal plane, and at this time at least a first leaking structure UC close to the top of the head (i.e., a gap formed between the cavum concha and the upper boundary of the inner side surface IS) and/or a second leaking structure LC close to the ear canal (i.e., a gap formed between the cavum concha and the lower boundary of the inner side surface IS) exist between the inner side surface IS of the sound production component and the cavum concha. As a result, the listening volume, especially in the low and middle frequencies, can be increased, while still retaining the far-field sound leakage cancellation effect, thus enhancing the acoustic output performance of the earphone 10.

In some embodiments, when the earphone 10 is worn in the manner shown in FIG. 8, the first leaking structure UC and/or the second leaking structure LC formed between the inner side surface IS of the sound production component and the cavum concha have a certain scale in the long-axis direction X and in the thickness direction Z. In some embodiments, in order to facilitate understanding of the position of the first leaking structure UC and the second leaking structure LC, when the earphone 10 is in the wearing state, a midpoint of two points formed by intersecting the upper/lower boundary of the inner side surface IS with the ear (e.g., a side wall of the cavum concha, a helix foot), respectively, may be taken as a position reference point of the first leaking structure UC/the second leaking structure LC, and a center of the ear canal opening of the ear canal may be taken as a position reference point of the ear canal. In some embodiments, in order to facilitate understanding of the position of the first leaking structure UC and the second leaking structure LC, when the earphone 10 is in the wearing state, the midpoint of the upper boundary of the inner side surface IS may be taken as a position reference point of the first leaking structure UC, and a trisection point of the lower boundary of the inner side surface IS close to the free end FE (hereinafter referred to as a ⅓ point of the lower boundary of the inner side surface IS) as a position reference point of the second leaking structure LC. In the present disclosure, when a junction between the inner side surface IS and the upper side surface US and/or the lower side surface LS is curved, the upper boundary of the inner side surface IS may refer to an intersection line between the inner side surface IS and the upper side surface US, and the lower boundary of the inner side surface IS may refer to an intersection line between the inner side surface IS and the lower side surface LS. In some embodiments, when one or more side surfaces of the sound production component 11 (e.g., the inner side surface IS, the upper side surface US, and/or the lower side surface LS) are curved, the intersection line of the two side surfaces may refer to an intersection line between tangent planes of the two side surfaces farthest from the center of the sound production component and parallel to the long or short-axis of the sound production component.

Merely by way of example, the present disclosure uses the midpoint of the upper boundary of the inner side surface IS and the ⅓ point of the lower boundary of the inner side surface IS as position reference points of the first leaking structure UC and the second leaking structure LC, respectively. It should be known that the selected midpoint of the upper boundary of the inner side surface IS and the ⅓ point of the lower boundary of the inner side surface IS are only used as exemplary reference points to describe the positions of the first leaking structure UC and the second leaking structure LC. In some embodiments, other reference points may also be selected to describe the positions of the first leaking structure UC and the second leaking structure LC. For example, due to the variability of different users' ears, the first leaking structure UC/the second leaking structure LC formed when the earphone 10 is worn is a gap with a gradually changing width, in this case, the reference position of the first leaking structure UC/the second leaking structure LC may be a position on the upper boundary/the lower boundary of the inner side surface IS near a region with the largest gap width. For example, the midpoint of the upper boundary of the inner side surface IS may be used as the position of the first leaking structure UC, and the ⅓ point of the lower boundary of the inner side surface IS proximate to the free end FE may be used as the position of the second leaking structure LC.

In some embodiments, as shown in FIG. 10, the projection of the upper boundary of the inner side surface IS on the sagittal plane may coincide with the projection of the upper side surface US on the sagittal plane, and the projection of the lower boundary of the inner side surface IS on the sagittal plane may coincide with the projection of the lower side surface LS on the sagittal plane. The projection of the position reference point of the first leaking structure UC (i.e., the midpoint of the upper boundary of the inner side surface IS) on the sagittal plane is point J. The projection of the position reference point of the second leaking structure LC (i.e., the ⅓ point of the lower boundary of the inner side surface IS) on the sagittal plane is point K. The "projection point J of the midpoint of the upper boundary of the inner side surface IS on the sagittal plane" may be a projection point on the sagittal plane of an intersection point between the upper boundary of the inner side surface IS and a short-axis center plane of the magnetic circuit assembly of the transducer. The short-axis center plane of the magnetic circuit assembly is a plane parallel to the short-axis direction of the sound production component 11 and passes through a geometric center of the magnetic circuit assembly. The "projection point K of the ⅓ point of the lower boundary of the inner side surface IS on the sagittal plane" may be a projection point on the sagittal plane of a trisection point of the lower boundary of the inner side surface IS near the free end FE.

As shown in FIG. 10, in some embodiments, in the wearing state, the projection of the sound production component 11 of the earphone 10 on the sagittal plane may at least partially cover the ear canal of the user, but the ear canal can communicate with the outside through the cavum concha to achieve the liberation of both ears of the user. In some embodiments, since the sound from the pressure relief hole 113 can be transmitted into the cavity structure through the leaking structure (e.g., the first leaking structure UC or the second leaking structure LC) and cancel each other out with the sound from the sound outlet 11, the pressure relief hole 113 cannot be too close to the first leaking structure UC and/or the second leaking structure LC.

In some embodiments, when at least a portion of a structure of the sound production component 11 extends into the cavum concha, and a ratio of the first distance $h_1$ between the centroid O of the first projection and the highest point of the second projection along the vertical axis direction to the height h of the second projection along the vertical axis direction is in a range of 0.35 to 0.6, the second leaking structure LC may be formed between the inner side surface IS of the sound production component and the cavum concha. In order to reduce the sound from the pressure relief hole 113 passing through the second leaking structure LC into the cavity-like structure to cancel with the sound from the sound outlet 112, the pressure relief hole 113 may not be too close to the second leaking structure LC. In some embodiments, a distance between a projection point of a center of the pressure relief hole 113 on the sagittal plane and a projection point of the ⅓ point of the lower boundary of the inner side surface on the sagittal plane may be in a range of 13.76 mm to 20.64 mm or 8.16 mm to 12.24 mm. In some embodiments, in order to minimize the sound from the pressure relief hole 113 from being transmitted into the cavity-like structure through the second leaking structure LC to cancel with the sound from the sound outlet 112, it is possible to set a distance between the pressure relief hole 113 and the second leaking structure LC relatively large to increase a listening volume. In some embodiments, to improve the listening volume, the distance between the projection point of the center of the pressure relief hole 113 on the sagittal plane and the projection point of the ⅓ point of the lower boundary of the inner side surface on the sagittal plane may be in a range of 18.24 mm to 20.64 mm or 10.74 mm to 12.24 mm. In some embodiments, in order to prevent the sound production component 11 from being oversized, which affects the wearing stability and comfort, the distance between the pressure relief hole 113 and the second leaking structure LC may be set at a relatively small distance. In some embodiments, the distance between the projection point of the center of the pressure relief hole 113 on the sagittal plane and the projection point of the ⅓ point of the lower boundary of the inner side surface on the sagittal plane may be in a range of 13.76 mm to 15.76 mm or 8.16 mm to 9.16 mm. In some embodiments, in order to take into account the listening effect of the earphone 10 as well as the comfort and stability of wearing the earphone 10, the distance between the projection point of the center of the pressure relief hole 113 on the sagittal plane and the projection point of the ⅓ point of the lower boundary of the inner side surface on the sagittal plane may be in a range of 15.76 mm to 18.64 mm or 9.16 mm to 11.24 mm. In some embodiments, in order to take into account the listening effect of the earphone 10 as well as the comfort and stability of wearing the earphone 10, the distance between the projection point of the center of the pressure relief hole 113 on the sagittal plane and the projection point of the ⅓ point of the lower boundary of the inner side surface on the sagittal plane may be in a range of 16.16 mm to 18.24 mm or 9.66 mm to 10.74 mm.

In the embodiment of the present disclosure, by setting the ratio of the first distance $h_1$ between the centroid O of the first projection and the highest point of the second projection along the vertical axis direction to the height h of the second projection along the vertical axis direction to be between 0.35 and 0.6, the sound production component 11 may be made to at least partially extend into the cavum concha and form a cavity-like acoustic model with the user's cavum concha, thereby increasing the listening volume of the earphone 10 at a listening position (e.g., at the ear canal opening), especially the listening volume at middle and low-frequency, while maintaining the better far-field sound leakage cancellation effect. In addition, when a portion or whole of the sound production component 11 extends into the cavum concha, the sound outlet 112 disposed on the inner side surface IS allows the sound outlet 112 to be located closer to the ear canal opening to further increase the listening volume at the ear canal opening; and, by limiting a distance between the center of the pressure relief hole 113 and a position reference point of the second leaking structure LC (the ⅓ point of the lower boundary of the inner side surface), the pressure relief hole 113 may be made to be further away from the second leaking structure LC to avoid the sound radiated from the pressure relief hole 113 from entering into the cavity which results in the sound cancellation, so as to improve the listening sound effect.

In some embodiments, one or more pressure relief holes 113 may include a first pressure relief hole 1131, and the first pressure relief hole 1131 may be disposed on at least one of an outer side surface OS, an upper side surface US, or a lower side surface LS of the housing 111. In some embodiments, the first pressure relief hole 1131 may be provided on the outer side surface OS or the upper side surface US of the housing 111. In some embodiments, the first pressure relief hole 1131 may be provided on the upper side surface US of the housing 111, as shown in FIG. 9. In some embodiments, the greater the distance between the projection point $O_1'$ of the center $O_1$ of the first pressure relief hole 1131 on the sagittal plane and the projection point K of the ⅓ point of the lower boundary of the inner side surface IS on the sagittal plane, the larger the volume V of the cavity structure. Therefore, in some embodiments, on the premise that the sound production component 11 is at least partially inserted into the cavum concha, in order to make the cavity structure have a suitable volume V and to make the first pressure relief hole 1131 relatively far away from the second leaking structure LC, so that the sound collection effect in the ear canal is relatively good, the distance between the projection point $O_1$' of the center $O_1$ of the first pressure relief hole 1131 on the sagittal plane and the projection point K of the ⅓ point of the lower boundary of the inner side surface IS on the sagittal plane is in a range of 13.76 mm to 20.4 mm. In some embodiments, in order to reduce the cancellation of the sound from the first pressure relief hole 1131 into the cavity-like structure with the sound from the sound outlet 112 through the second leaking structure LC, the distance between the first pressure relief hole 1131 and the second leaking structure LC may be set relatively large to increase the listening volume. In some embodiments, the distance between the projection point $O_1$' of the center $O_1$ of the first pressure relief hole 1131 on the sagittal plane and the projection point K of the ⅓ point of the lower boundary of the inner side surface IS on the sagittal plane is in a range of 18.64 mm to 20.64 mm. In some embodiments, in order to prevent the sound production component 11 from being overly large, which affects the wearing stability and comfort, the distance between the first pressure relief hole 1131 and the second leaking structure LC may be set at a smaller distance. In some embodiments, the distance between the projection point $O_1$' of the center $O_1$ of the first pressure relief hole 1131 on the sagittal plane and the projection point K of the ⅓ point of the lower boundary of the inner side surface IS on the sagittal plane is in a range of 13.76 mm to 15.76 mm. In some embodiments, in order to take into account the listening effect as well as the wearing comfort and stability, the distance between the projection point $O_1$' of the center $O_1$ of the first pressure relief hole 1131 on the sagittal plane and the projection point K of the ⅓ point of the lower boundary of the inner side surface IS on the sagittal plane is in a range of 15.76 mm to 18.64 mm. In some embodiments, in order to take into account the listening effect as well as the wearing comfort and stability, the distance between the projection point $O_1$' of the center $O_1$ of the first pressure relief hole 1131 on the sagittal plane and the projection point K of the ⅓ point of the lower boundary of the inner side surface IS on the sagittal plane is in a range of 16.16 mm to 18.24 mm.

In some embodiments, the ear canal opening may be used as a reference point of the listening position, and positions of the first pressure relief hole 1131 and the sound outlet 112 from the ear canal opening may affect the listening effect. In some embodiments, the sound outlet 112 may be set closer to the ear canal opening, while the first pressure relief hole 1131 is farther away from the ear canal opening, in this way, the sound wave output from the sound outlet 112 to the ear canal opening may increase, and the sound wave output from the first pressure relief hole 1131 passing to the ear canal opening may decrease, so as to cancel with the sound wave from the sound outlet 112, thereby improving the listening effect. In some embodiments, a distance between the projection point $O_1$' of the center $O_1$ of the first pressure relief hole 1131 on the sagittal plane and a projection point $O_3$' of a center $O_3$ of the ear canal opening on the sagittal plane is in a range of 12 mm to 18 mm; and a distance between a point $O_4$' of a center $O_4$ of the sound outlet 112 on the sagittal plane and the projection point $O_3$' of the center $O_3$ of the ear canal opening on the sagittal plane is in a range of 2.2 mm to 3.8 mm. In some embodiments, in order to increase the transmission of the sound wave output from the sound outlet 112 to the ear canal opening, the sound outlet 112 may be set closer to the ear canal opening, and in order to reduce the transmission of the sound wave output from the first pressure relief hole 1131 to the ear canal opening to cancel the sound wave from the sound outlet 112, the first pressure relief hole 1131 is set at a further distance from the ear canal opening. Based on this, in some embodiments, a distance between the projection point $O_1$' of the center $O_1$ of the first pressure relief hole 1131 on the sagittal plane and the projection point $O_3$' of the center $O_3$ of the ear canal opening on the sagittal plane may be in a range of 16 mm to 18 mm; a distance between the projection point $O_4$' of the center $O_4$ of the sound outlet 112 on the sagittal plane and the projection point $O_3$' of the center $O_3$ of the ear canal opening on the sagittal plane may be in a range of 2.2 mm to 2.4 mm. In some embodiments, if the distance between the first pressure relief hole 1131 and the ear canal opening is too far away, it may make an opening of the cavity structure of the second leaking structure LC too large, which affects the listening effect. In some embodiments, the distance between the projection point $O_1$' of the center 01 of the first pressure relief hole 1131 on the sagittal plane and the projection point $O_3$' of the center $O_3$ of the ear canal opening on the sagittal plane may be in a range of 12 mm to 16 mm; and the distance between the projection point $O_4$' of the center $O_4$ of the sound outlet 112 on the sagittal plane and the projection point $O_3$' of the center $O_3$ of the ear canal opening on the sagittal plane may be in a range of 2.4 mm to 3.8 mm. In some embodiments, in order to improve the listening effect, the distance between the projection point $O_1$' of the center $O_1$ of the first pressure relief hole 1131 on the sagittal plane and the projection point $O_3$' of the center $O_3$ of the ear canal opening on the sagittal plane may be in a range of 14 mm to 16 mm; and the distance between the projection point $O_4$' of the center $O_4$ of the sound outlet 112 on the sagittal plane and the projection point $O_3$' of the center $O_3$ of the ear canal opening on the sagittal plane may be in a range of 2.4 mm to 3.6 mm. In some embodiments, in order to improve the hearing effect, the distance between the projection point $O_1$' of the center $O_1$ of the first pressure relief hole 1131 on the sagittal plane and the projection point $O_3$' of the center $O_3$ of the ear canal opening on the sagittal plane may be in a range of 14.5 mm to 15.5 mm; and the distance between the projection point $O_4$' of the center $O_4$ of the sound outlet 112 on the sagittal plane and the projection point $O_3$' of the center $O_3$ of the ear canal opening on the sagittal plane may be in a range of 2.8 mm to 3.2 mm.

In addition, by setting the distance between the projection point $O_4$' of the center $O_4$ of the sound outlet 112 on the sagittal plane and the projection point $O_3$' of the center $O_3$ of the ear canal opening on the sagittal plane, it is also possible to ensure that the sound outlet 112 is at a position closer to the ear canal and is not blocked by a tragus.

In some embodiments, in order to avoid the sound wave emitted from the first pressure relief hole 1131 and the sound wave emitted from the sound outlet 112 canceling each other out in the near-field and affecting the listening quality for the user, the distance between the first pressure relief hole 1131 and the sound outlet 112 may not be too close. In some embodiments, in order to avoid the sound wave emitted from the first pressure relief hole 1131 and the sound wave emitted from the sound outlet 112 canceling each other out in the near-field and affecting the user's listening quality, the distance between the first pressure relief hole 1131 and the sound outlet 112 can be relatively far, and the distance between the center $O_1$ of the first pressure relief hole 1131 and the center $O_4$ of the sound outlet 112 may be in a range of 4 mm to 15.11 mm. In some embodiments, the distance between the center $O_1$ of the first pressure relief hole 1131 and the center $O_4$ of the sound outlet 112 may be in a range of 4 mm to 15.11 mm. In some embodiments, in order to ensure the listening quality, the distance between the center $O_1$ of the first pressure relief hole 1131 and the center $O_4$ of the sound outlet 112 may be in a range of 5.12 mm to 15.11 mm. In some embodiments, when the distance between the first pressure relief hole 1131 and the sound outlet 112 is relatively large, the size of the sound production component 11 is also relatively large, and in order to prevent the size of the sound production component 11 from being too large and causing wearing problems (e.g., stability and comfort), the distance between the center $O_1$ of the first pressure relief hole 1131 and the center $O_4$ of the sound outlet 112 may be in a range of 7 mm to 9.55 mm. In some embodiments, the distance between the center $O_1$ of the first pressure relief hole 1131 and the center $O_4$ of the sound outlet 112 may be no less than 5 mm to 14 mm. In some embodiments, the distance between the center $O_1$ of the first pressure relief hole 1131 and the center $O_4$ of the sound outlet 112 may be no less than 6 mm to 13 mm. In some embodiments, in order to take into account the listening effect as well as wearing stability and comfort, the distance between the center $O_1$ of the first pressure relief hole 1131 and the center $O_4$ of the sound outlet 112 may be no less than 7 mm to 12 mm. In some embodiments, in order to take into account the listening effect as well as the wearing stability and comfort, the distance between the center $O_1$ of the first pressure relief hole 1131 and the center $O_4$ of the sound outlet 112 may be no less than 8 mm to 10 mm. In some embodiments, the distance between the center $O_1$ of the first pressure relief hole 1131 and the center $O_4$ of the sound outlet 112 may be 9.55 mm.

In some embodiments, referring to FIG. 5A-FIG. 5B, in order to enable at least a portion of the structure of the sound production component 11 of the earphone 10 to extend into the cavum concha 102 when the earphone 10 is in the wearing state, and to enable the sound production component 11 of the earphone 10 to form an acoustic model with the cavum concha as shown in FIG. 4 to improve the listening volume of the earphone 10 at the listening position (e.g., at the ear canal opening), especially at a middle and low-frequency, while maintaining a better far-field sound leakage cancellation effect, a ratio of a distance $w_1$ (also referred as a second distance) between the centroid O of the first projection and an end point of the second projection along the sagittal axis direction (e.g., along an S-axis direction shown in FIG. 5A) to a width w of the second projection along the sagittal axis direction may be in a range of 0.4 to 0.7. In some embodiments, when the sound production component 11 forms the cavity-like acoustic model with the cavum concha, the ratio of the distance $w_1$ between the centroid O of the first projection and the end point of the second projection along the sagittal axial direction to the width w of the second projection along the sagittal axial direction may affect a size of the opening of the cavity-like structure, thereby affecting the listening effect. In some embodiments, in order to prevent the opening of the cavity-like structure from being too large and thus resulting in a low listening volume, the ratio of the distance $w_1$ (also referred to as a second distance) between the centroid O of the first projection and the end point of the second projection along the sagittal axis direction (e.g., along the S-axis direction shown in FIG. 5A) to the width w of the second projection along the sagittal axis direction may be in a range of 0.45 to 0.65. In some embodiments, in order to prevent the opening of the cavity-like structure from being too large and resulting in a low listening volume, the ratio of the distance $w_1$ (also referred to as a second distance) between the centroid O of the first projection and the end point of the second projection along the sagittal axis direction (e.g., along the S-axis direction shown in FIG. 5A) to the width w of the second projection along the sagittal axis direction may be in a range of 0.5 to 0.6.

It should also be noted that an area of the first projection of the sound production component 11 on the sagittal plane may be generally much smaller than an area of a projection of an auricle on the sagittal plane, so as to ensure that the ear canal opening of the user can not be blocked when the user wears the open earphone 10, and a load on the user when wearing the earphone can be reduced, which is convenient for the user on a daily basis. Under this premise, in the wearing state, when the ratio of the distance $w_1$ between the centroid O of the first projection and the end point of the second projection along the sagittal axis direction to the width w of the second projection along the sagittal axis direction is too large or too small, this may also cause the earphone 10 to be worn unstably. Based on this, for the earphone provided by embodiments of the present disclosure, by controlling the ratio of the distance $w_1$ between the centroid O of the first projection and the end point of the second projection along the sagittal axis direction to the width w of the second projection along the sagittal axis direction to be in a range of 0.4 to 0.7, it is also possible to enhance the wearing stability and comfort of the earphone while ensuring the acoustic output effect of the sound production component.

As a specific example, in some embodiments, the width of the second projection along the sagittal axis direction may be in a range of 40 mm to 55 mm, and when the distance between the centroid O of the first projection on the sagittal plane and the end point of the second projection along the sagittal axis direction is more than 45 mm or less than 15 mm, the sound production component 11 may be too forward or too backward with respect to the user's ear, which may lead to the problem that the sound production component 11 is unable to construct the acoustic model shown in FIG. 4, and at the same time lead to the instability of wearing the earphone 10. Thus, in order to ensure the acoustic output effect of the sound production component 11 and the stability of wearing the earphone, the distance between the centroid O of the first projection and the end point of the second projection along the sagittal axis direction may be controlled to be between 15 mm and 45 mm.

In some embodiments, referring to FIG. 9, the distance between the first pressure relief hole 1131 and the rear side surface RS of the housing 111, or the distance between the sound outlet 112 and the rear side surface RS of the housing 111 may reflect a distance from the first pressure relief hole 1131 or the sound outlet 112 to the second leaking structure LC along the sagittal axis direction. In some embodiments, the distance between the first pressure relief hole 1131 and the rear side surface RS may be set farther away (relative to the distance between the sound outlet 112 and the rear side surface RS) to reduce sound wave output from the first pressure relief hole 1131 entering the cavity structure and canceling with the sound waves output from the sound outlet 112, thereby improving the listening effect. It is also considered that the distance between the first pressure relief hole 1131 and the rear side surface RS being too large may lead to the size of the sound production component 11 being too large along the X-axis direction, which may lead to instability in wearing and other problems. Based on this, in some embodiments, a distance $a_3$ between the center $O_1$ of the first pressure relief hole 1131 and the rear side surface RS is in a range of 10.44 mm to 15.68 mm; and a distance $d_2$ between the center $O_4$ of the sound outlet 112 and the rear side surface RS is in a range of 8.15 mm to 12.25 mm. In some embodiments, in order to make the first pressure relief hole 1131 more distant from the rear side surface RS to improve the listening effect, the distance $a_3$ between the center $O_1$ of the first pressure relief hole 1131 and the rear side surface RS is in a range of 14.55 mm to 15.68 mm; and the distance $d_2$ between the center $O_4$ of the sound outlet 112 and the rear side surface RS is in a range of 8.15 mm to 9.25 mm. In some embodiments, in order to make the sound production component 11 have a suitable size along the X-axis direction (i.e., the size of the sound production component 11 along the X-axis direction may not be too large) to improve the stability and wearing comfort, the distance $a_3$ between the center $O_1$ of the first pressure relief hole 1131 and the rear side surface RS is in a range of 10.44 mm to 12.15 mm, and the distance $d_2$ between the center $O_4$ of the sound outlet 112 and the rear side surface RS is in a range of 8.5 mm to 9.25 mm. In some embodiments, in order to take into account both the listening effect and the wearing effect, the distance $a_3$ between the center $O_1$ of the first pressure relief hole 1131 and the rear side surface RS is in a range of 11.00 mm to 14.55 mm; and the distance $d_2$ between the center $O_4$ of the sound outlet 112 and the rear side surface RS is in a range of 8.5 mm to 12.00 mm. In some embodiments, in order to balance the listening effect and the wearing effect, the distance $a_3$ between the center $O_1$ of the first pressure relief hole 1131 and the rear side surface RS is in a range of 12.15 mm to 13.25 mm; and the distance $d_2$ between the center $O_4$ of the sound outlet 112 and the rear side surface RS is in a range of 9.25 mm to 11.15 mm.

In addition, by setting a range of the distance $a_3$ between the center $O_1$ of the first pressure relief hole 1131 and the rear side surface RS and a range of the distance $d_2$ between the center $O_4$ of the sound outlet 112 and the rear side surface RS, it is also possible to ensure, on the premise of ensuring that at least a portion of the sound production component 11 inserts into the cavum concha, that all or part of a region of the first pressure relief hole 1131 and the sound outlet 112 from being blocked along the X direction due to the abutment of the free end FE with the surface of the cavum concha, and thus avoiding that an effective area of the first pressure relief hole 1131 and the sound outlet 112 from reduction.

Figure 11:
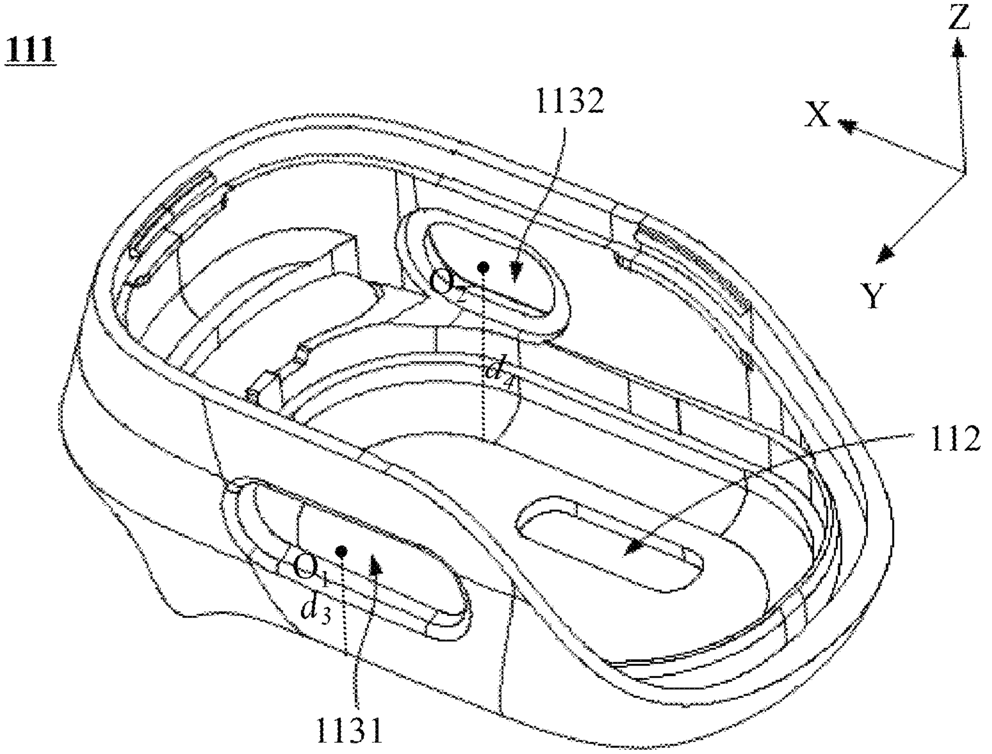
FIG. 11 is a schematic diagram illustrating an exemplary structure of a housing according to some embodiments of the present disclosure.

FIG. 11 is a schematic diagram illustrating an exemplary structure of a housing according to some embodiments of the present disclosure. In some embodiments, referring to FIG. 8 to FIG. 11, in order to avoid reducing an effective area of the first pressure relief hole 1131 due to a portion or whole area of the first pressure relief hole 1131 being blocked along the Z-direction, a distance between the center $O_1$ of the first pressure relief hole 1131 and the inner side surface IS of the sound production component 11 along the Z-direction may not be too small. Additionally, a larger area of the first pressure relief hole 1131 also results in a larger intensity of a sound that is directed from the first pressure relief hole 1131 and transmitted to an ear canal, therefore, in order to ensure that the first pressure relief hole 1131 has an appropriate effective area, the distance between the center Qi of the first pressure relief hole 1131 and the inner side surface IS of the sound production component 11 along the Z-direction may not be too small. In some embodiments, a distance $d_3$ between the center Qi of the first pressure relief hole 1131 and the inner side surface IS of the sound production component along the Z-direction may be in a range of 4.24 mm to 6.38 mm. In some embodiments, the distance $d_3$ between the center Qi of the first pressure relief hole 1131 and the inner side surface IS of the sound production component along the Z-direction may be in a range of 4.50 mm to 5.85 mm. In some embodiments, the distance $d_3$ between the center $O_1$ of the first pressure relief hole 1131 and the inner side surface IS of the sound production component along the Z-direction may be in a range of 4.80 mm to 5.50 mm. In some embodiments, the distance $d_3$ between the center $O_1$ of the first pressure relief hole 1131 and the inner side surface IS of the sound production component along the Z-direction may be in a range of 5.20 mm to 5.55 mm. In addition, due to a difference in wearing an earphone, the inner side surface IS of the sound production component 11 and the cavum concha may form the first leaking structure UC, and such a setting may also cause the first pressure relief hole 1131 to be located away from the first leaking structure UC, so as to avoid that a sound wave output by the first pressure relief hole 1131 enters into the first leaking structure UC and cancels with a sound wave output from the sound outlet 112, henceforth affecting the listening effect.

In some embodiments, one or more pressure relief holes 113 may include a second pressure relief hole 1132, and the second pressure relief hole 1132 may be disposed on at least one of an outer side surface OS, an upper side surface US, or a lower side surface LS of the housing 111. In some embodiments, the second pressure relief hole 1132 may be provided on the outer side surface OS or the lower side surface LS of the housing 111. In some embodiments, the second pressure relief hole 1132 may be provided on the lower side surface LS of the housing 111, as shown in FIG. 9. In some embodiments, in order to reduce the sound of the second pressure relief hole 1132 transmitted into a cavity structure via the second leaking structure LC to cancel with the sound of the sound outlet 112, a distance between a projection point $O_2'$ of a center $O_2$ of the second pressure relief hole 1132 on a sagittal plane and a projection point B of a ⅓ point of a lower boundary of the inner side surface IS on the sagittal plane is in a range of 8.16 mm to 12.24 mm. In some embodiments, in order to reduce the cancellation of the sound from the second pressure relief hole 1132 into the cavity-like structure with the sound from the sound outlet 112 through the second leaking structure LC, a distance between the second pressure relief hole 1132 and the second leaking structure LC may be set relatively large to increase the listening volume. In some embodiments, the distance between the projection point $O_2'$ of the center $O_2$ of the second pressure relief hole 1132 on the sagittal plane and the projection point B of the ⅓ point of the lower boundary of the inner side surface IS on the sagittal plane is in a range of 10.74 mm to 12.24 mm. In some embodiments, in order to prevent the sound production component 11 from being oversized, which affects the wearing stability and comfort, the distance between the second pressure relief hole 1132 and the second leaking structure LC may be set at a smaller distance. In some embodiments, the distance between the projection point $O_2'$ of the center $O_2$ of the second pressure relief hole 1132 on the sagittal plane and the projection point B of the ⅓ point of the lower boundary of the inner side surface IS on the sagittal plane is in a range of 8.16 mm to 10.74 mm. In some embodiments, in order to take into account the listening effect and the wearing effect, the distance between the projection point $O_2'$ of the center $O_2$ of the second pressure relief hole 1132 on the sagittal plane and the projection point B of the ⅓ point of the lower boundary of the inner side surface IS on the sagittal plane is in a range of 9.16 mm to 11.24 mm. In some embodiments, in order to balance the listening effect and wearing effect, the distance between the projection point $O_2'$ of the center $O_2$ of the second pressure relief hole 1132 on the sagittal plane and the projection point B of the ⅓ point of the lower boundary of the inner side surface IS on the sagittal plane is in a range of 9.66 mm to 10.74 mm.

In some embodiments, an ear canal opening serves as a reference point of a listening position, and the positions of the second pressure relief hole 1132 and the sound outlet 112 from the ear canal opening may affect the listening effect. In some embodiments, the sound outlet 112 may be set closer to the ear canal opening, while the second pressure relief hole 1132 is farther away from the ear canal opening, whereby the sound wave output from the sound outlet 112 to the ear canal opening may increase, while the sound wave output from the second pressure relief hole 1132 to the ear canal opening that cancels with the sound wave from the sound outlet 112 may decrease, thereby improving the listening effect. In some embodiments, a distance between the projection point $O_2'$ of the center $O_2$ of the second pressure relief hole on the sagittal plane and a projection point $O_3$ of a center $O_3$ of the ear canal opening on the sagittal plane is in a range of 6.88 mm to 10.32 mm; and a distance between a projection point $O_4'$ of a center $O_4$ of the sound outlet 112 on the sagittal plane and the projection point $O_3'$ of the center $O_3$ of the ear canal opening on the sagittal plane is in a range of 2.2 mm to 3.8 mm. In some embodiments, in order to increase the sound wave output from the sound outlet 112 to the ear canal opening, the sound outlet 112 may be set closer to the ear canal opening, and the second pressure relief hole 1132 may be set farther away from the ear canal opening to minimize the sound wave output from the second pressure relief hole 1132 to the ear canal opening that cancels with the sound wave from the sound outlet 112. In some embodiments, the distance between the projection point $O_2'$ of the center $O_2$ of the second pressure relief hole on the sagittal plane and the projection point $O_3$ of the center $O_3$ of the ear canal opening on the sagittal plane is in a range of 9.32 mm to 10.32 mm; and the distance between the projection point $O_4'$ of the center $O_4$ of the sound outlet 112 on the sagittal plane and the projection point $O_3'$ of the center $O_3$ of the ear canal opening on the sagittal plane is in a range of 2.2 mm to 3.4 mm. In some embodiments, if the second pressure relief hole 1132 is too far from the ear canal opening, this may result in a larger opening of a cavity structure of the second leaking structure LC, which may affect the listening quality. In some embodiments, the distance between the projection point $O_2'$ of the center $O_2$ of the second pressure relief hole on the sagittal plane and the projection point $O_3$ of the center $O_3$ of the ear canal opening on the sagittal plane is in a range of 6.88 mm to 9.32 mm; and the distance between the projection point $O_4'$ of the center $O_4$ of the sound outlet 112 on the sagittal plane and the projection point $O_3'$ of the center $O_3$ of the ear canal opening on the sagittal plane is in a range of 3.4 mm to 3.8 mm. In some embodiments, in order to improve the listening effect, the distance between the projection point $O_2'$ of the center $O_2$ of the second pressure relief hole on the sagittal plane and the projection point $O_3$ of the center $O_3$ of the ear canal opening on the sagittal plane is in a range of 7.88 mm to 9.32 mm; and the distance between the projection point $O_4'$ of the center $O_4$ of the sound outlet 112 on the sagittal plane and the projection point $O_3'$ of the center $O_3$ of the ear canal opening on the sagittal plane is in a range of 2.4 mm to 3.6 mm. In some embodiments, in order to improve the listening effect, the distance between the projection point $O_2'$ of the center $O_2$ of the second pressure relief hole on the sagittal plane and the projection point $O_3$ of the center $O_3$ of the ear canal opening on the sagittal plane is in a range of 7.88 mm to 8.32 mm; and the distance between the projection point $O_4'$ of the center $O_4$ of the sound outlet 112 on the sagittal plane and the projection point $O_3'$ of the center $O_3$ of the ear canal opening on the sagittal plane is in a range of 2.6 mm to 3.4 mm.

In addition, by setting the distance between the projection point $O_4'$ of the center $O_4$ of the sound outlet 112 on the sagittal plane and the projection point $O_3'$ of the center $O_3$ of the ear canal opening on the sagittal plane, it is also possible to ensure that the sound outlet 112 is at a position closer to the ear canal and is not blocked by the tragus.

In some embodiments, similar to the case where the pressure relief hole 113 includes the first pressure relief hole 1131, when the pressure relief hole 113 includes the second pressure relief hole 1132, in order to enable at least a portion of a structure of the sound production component 11 to extend into the cavum concha when the earphone 10 is in a wearing state, and to enable the sound production component 11 of the earphone 10 and the cavum concha to form the acoustic model as illustrated in FIG. 4, so as to improve the listening volume of the earphone 10 at a listening position (e.g., at the ear canal opening), in particular at a middle and low-frequency, and at the same time to maintain a better far-field sound leakage cancellation effect, a ratio of the distance $w_1$ (i.e., the second distance) between the centroid O of the first projection and the end point of the second projection along the sagittal axis direction (e.g., the S-axis direction shown in FIG. 5A) to the width w of the second projection along the sagittal axis direction may be in a range of 0.4 to 0.7. When the sound production component 11 forms the acoustic model of the cavity-like structure with the cavum concha, the ratio of the distance $w_1$ between the centroid O of the first projection and the end point of the second projection along the sagittal axial direction to the width w of the second projection along the sagittal axial direction may also affect the size of an opening of the cavity-like structure, thus affecting the listening effect. In some embodiments, in order to prevent the opening of the cavity-like structure from being too small and thus resulting in a low listening volume, in some embodiments, the ratio of the distance $w_1$ (i.e., the second distance) between the centroid O of the first projection and the end point of the second projection along the sagittal axial direction (e.g., in the S-axis direction shown in FIG. 5A) to the width w of the second projection along the sagittal axis direction may be in a range of 0.45 to 0.65. In some embodiments, the ratio of the distance $w_1$ (i.e., the second distance) between the centroid O of the first projection and the end point of the second projection along the sagittal axis direction (e.g., in the S-axis direction as shown in FIG. 5A) to the width w of the second projection along the sagittal axis direction may be in a range of 0.5 to 0.6.

In some embodiments, a distance between the second pressure relief hole 1132 or the sound out hole 112 from the rear side surface RS of the housing 111 may reflect a distance from the second pressure relief hole 1132 or the sound outlet 112 to the first leaking structure UC along the sagittal axis direction. In some embodiments, the second pressure relief hole 1132 may be set farther away from the rear side surface RS (relative to a distance from the sound outlet 112 to the rear side surface RS) to minimize a sound wave output from the second pressure relief hole 1132 that enters a cavity structure of the first leaking structure UC and cancels with a sound wave output from the sound outlet 112, thereby improving the listening effect. It is also considered that the distance from the second pressure relief hole 1132 to the rear side surface RS being too far may result in the sound production component 11 being oversized along the X-axis, resulting in wearing instability, or the like. Based on this, in some embodiments, a distance $a_4$ between the center $O_2$ of the second pressure relief hole 1132 and the rear side surface RS is in a range of 13.51 mm to 20.27 mm; the distance $d_2$ between the center $O_4$ of the sound outlet 112 and the rear side surface RS of the sound production component is in a range of 8.15 mm to 12.25 mm. In some embodiments, in order to move the second pressure relief hole 1132 further away from the rear side surface RS and to improve the listening effect, the distance $a_4$ between the center $O_2$ of the second pressure relief hole 1132 and the rear side surface RS is in a range of 17.15 mm to 20.27 mm, and the distance $d_2$ between the center $O_4$ of the sound outlet 112 and the rear side surface RS is in a range of 8.15 mm to 9.25 mm. In some embodiments, in order to make the sound production component 11 have a suitable size along the X-axis direction (i.e., a size of the sound production component 11 along the X-axis direction may not be too large) to improve the stability and wearing comfort of the sound production component 11, the distance $a_4$ between the center $O_2$ of the second pressure relief hole 1132 and the rear side surface RS is in a range of 13.51 mm to 17.15 mm; and the distance $d_2$ between the center $O_4$ of sound outlet and the rear side surface RS is in a range of 9.25 mm to 12.25 mm. In some embodiments, in order to take into account both the listening effect and the size of the sound production component 11, the distance $a_4$ between the center $O_2$ of the second pressure relief hole 1132 and the rear side surface RS is in a range of 13.51 mm to 17.15 mm, and the distance $d_2$ between the center $O_4$ of the sound outlet 112 and the rear side surface RS of the sound production component 11 along the X-direction is in a range of 8.50 mm to 12.00 mm. In some embodiments, in order to balance the listening effect and the size of the sound production component 11, the distance $a_4$ between the center $O_2$ of the second pressure relief hole 1132 and the rear side surface RS is in a range of 17.15 mm to 18.25 mm, and the distance $d_2$ between the center $O_4$ of the sound outlet 112 and the rear side surface RS of the sound production component 11 along the X-direction is in a range of 9.25 mm to 11.15 mm.

In some embodiments, in order to avoid a portion or whole of an area of the second pressure relief hole 1132 from being blocked along the Z-direction so that an effective area of the second pressure relief hole 1132 is reduced, a distance between the center $O_2$ of the second pressure relief hole 1132 and the inner side surface IS of the sound production component 11 along the Z-direction may not be too small. In addition, a larger area of the second pressure relief hole 1132 also results in a larger intensity of a sound that is directed from the second pressure relief hole 1132 and transmitted to the ear canal, therefore, in order to ensure that the second pressure relief hole 1132 has a suitable effective area, a distance between the center $O_2$ of the second pressure relief hole 1132 and the inner side surface IS of the sound production component 11 along the Z-direction may not be too small. In some embodiments, a distance d4 between the center $O_2$ of the second pressure relief hole 1132 and the inner side surface IS of the sound production component along the Z-direction may be in a range of 4.24 mm to 6.3 mm. In some embodiments, in order to ensure that the second pressure relief hole 1132 has a suitable effective area, the distance d4 between the center $O_2$ of the second pressure relief hole 1132 and the inner side surface IS of the sound production component 11 along the Z-direction is in a range of 4.50 mm to 5.85 mm. In some embodiments, the distance d4 between the center $O_2$ of the second pressure relief hole 1132 and the inner side surface IS of the sound production component 11 along the Z-direction is in a range of 4.80 mm to 5.50 mm. In some embodiments, the distance d4 between the center $O_2$ of the second pressure relief hole 1132 and the inner side surface IS of the sound production component 11 along the Z-direction is in a range of 5.20 mm to 5.55 mm. In some embodiments, it is necessary to make the sound outlet 112 closer to the ear canal to increase the listening efficiency, so that the sound outlet 112 is close to the lower side surface LS.

By setting a range of the distance d4 between the center $O_2$ of the second pressure relief hole 1132 and the inner side surface IS of the sound production component 11 along the Z-direction, it is possible to avoid that all or a portion of an area of the second pressure relief hole 1132 is blocked along a coronal axis direction such that the effective area of the second pressure relief hole 1132 is reduced.

Figure 12:
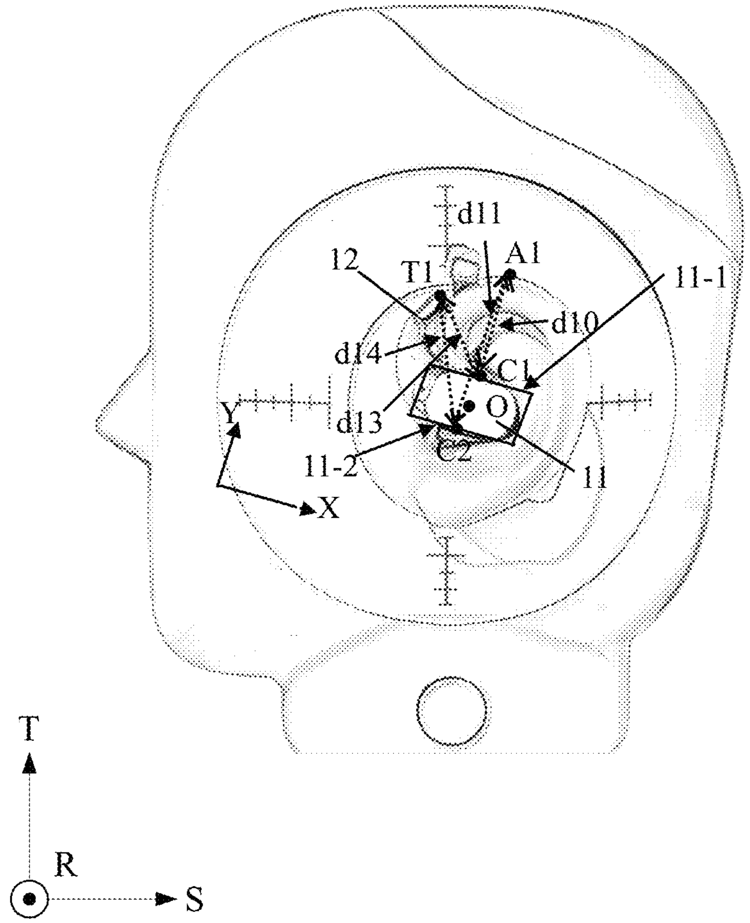
FIG. 12 is a schematic diagram illustrating a wearing state of an earphone according to some embodiments of the present disclosure.

FIG. 12 is a schematic diagram illustrating a wearing state of an earphone according to some embodiments of the present disclosure. As can be seen from the above descriptions, a whole or a portion of a structure of the sound production component 11 extends into the cavum concha 102 may form the cavity-like structure as shown in FIG. 4, and the listening effect of the earphone 10 when the earphone 10 is worn by a user is related to a size of a gap formed between the sound production component 11 and the cavum concha 102, with the smaller the size of the gap, the higher the listening volume at the user's ear canal opening. The size of the gap formed between the sound production component 11 and an edge of the cavum concha 102 is correlated with an inclination angle between a projection of an upper side surface 11-1 or a lower side surface 11-2 of the sound production component 11 on the sagittal plane and a horizontal plane and with a size of the sound production component 11.

As shown in FIG. 12, when the size of the sound production component 11 (in particular a size along the short-axis direction Y illustrated in FIG. 12) is too small, the gap formed between the sound production component 11 and the edge of the cavum concha 102 may be too large, affecting a listening volume at an ear canal opening of a user. When the size of the sound production component 11 (in particular the size along the short-axis direction Y illustrated in FIG. 12) is too large, there may be very little of the portion of the sound production component 11 that may extend into the cavum concha 102 or the sound production component 11 may completely cover the cavum concha 102. At this point, the ear canal opening is blocked in this case, and the communication between the ear canal opening and an external environment may not be realized, thus failing to achieve an original design intention of an open earphone. In addition, an excessively large size of the sound production component 11 may affect the wearing comfort of the user and the convenience of carrying. In some embodiments, a distance between midpoints of projections of the upper side surface 11-1 and the lower side surface 11-2 of the sound production component 11 on the sagittal plane and a projection of an upper vertex of an ear-hook on the sagittal plane may reflect the size of the sound production component 11 along the short-axis direction Y. The upper vertex of the ear-hook may be a position on the ear-hook that has a maximum distance along the vertical axis direction with respect to a specific point on the user's neck when the user is wearing the earphone, for example, an upper vertex T1 illustrated in FIG. 8. In order to ensure that the earphone 10 does not block the ear canal opening of the user while improving the listening effect of the earphone 10, in some embodiments, a distance d13 between a midpoint C1 of the projection of the upper side surface 11-1 of the sound production component 11 on the sagittal plane and a projection of the upper vertex T1 of the ear-hook on the sagittal plane is in a range of 17 mm to 36 mm, and a distance d14 between a midpoint C2 of the projection of the lower side surface 11-2 of the sound production component 11 on the sagittal plane and the projection of the upper vertex T1 of the ear-hook on the sagittal plane is in a range of 28 mm to 52 mm. Preferably, the distance d13 between the midpoint C1 of the projection of the upper side surface 11-1 of the sound production component 11 on the sagittal plane and the projection of the upper vertex T1 of the ear-hook on the sagittal plane is in a range of 21 mm to 32 mm, and the distance d14 between the midpoint C2 of the projection of the lower side surface 11-2 of the sound production component 11 on the sagittal plane and the projection of the upper vertex T1 of the ear-hook is in a range of 32 mm to 48 mm. More preferably, the distance d13 between the midpoint C1 of the projection of the upper side surface 11-1 of the sound production component 11 on the sagittal plane and the projection of the upper vertex T1 of the ear-hook on the sagittal plane is in a range of 24 mm to 30 mm, and the distance d14 between the midpoint C2 of the projection of the lower side surface 11-2 of the sound production component 11 on the sagittal plane and the projection of the upper vertex T1 of the ear-hook on the sagittal plane is in a range of 35 mm to 45 mm.

When the distance d13 between the midpoint C1 of the projection of the upper side surface 11-1 of the sound production component 11 on the sagittal plane and the projection of the upper vertex T1 of the ear-hook is in a range of 21 mm to 32 mm, the upper side surface 11-1 is farther away from the upper vertex T1 of the ear-hook in the wearing state, which results in a downward position of the sound production component 11 in the ear, at which time the sound production component 11 and the cavum concha may form the first leaking structure UC. In order to minimize a sound wave output from the second pressure relief hole 1132 that enters a cavity structure of the first leaking structure UC and cancels with a sound wave output from the sound outlet 112, the second pressure relief hole 1132 may be set further away from the first leaking structure UC. In some embodiments, a distance between the projection point $O_2$' of the center $O_2$ of the second pressure relief hole 1132 on the sagittal plane and the projection point J of the midpoint of the upper boundary of the inner side surface IS on the sagittal plane is in a range of 14.4 mm to 21.6 mm. In some embodiments, in order to minimize the sound wave output from the second pressure relief hole 1132 that enters the cavity structure of the first leaking structure UC and cancels with the sound wave output from the sound outlet 112, the second pressure relief hole 1132 may be located at a greater distance from the first leaking structure UC. In some embodiments, the distance between the projection point $O_2$' of the center $O_2$ of the second pressure relief hole 1132 on the sagittal plane and the projection point J of the midpoint of the upper boundary of the inner side surface IS on the sagittal plane is in a range of 18.2 mm to 21.6 mm. In some embodiments, the second pressure relief hole 1132 being too far away from the first leaking structure UC may also result in the sound production component 11 being oversized, which may affect the wearing comfort and stability. In some embodiments, the distance between the projection point $O_2$' of the center $O_2$ of the second pressure relief hole 1132 on the sagittal plane and the projection point J of the midpoint of the upper boundary of the inner side surface IS on the sagittal plane is in a range of 14.4 mm to 18.2 mm. In some embodiments, in order to take into account both the listening effect and the wearing effect, the distance between the projection point $O_2$' of the center $O_2$ of the second pressure relief hole 1132 on the sagittal plane and the projection point J of the midpoint of the upper boundary of the inner side surface IS on the sagittal plane is in a range of 16.4 mm to 19.6 mm. In some embodiments, in order to take into account both the listening effect and the wearing effect, the distance between the projection point $O_2$' of the center $O_2$ of the second pressure relief hole 1132 on the sagittal plane and the projection point J of the midpoint of the upper boundary of the inner side surface IS on the sagittal plane is in a range of 17.8 mm to 18.2 mm.

Additionally, the greater the distance between the projection point $O_2$' of the center $O_2$ of the second pressure relief hole 1132 on the sagittal plane and the projection point J of the midpoint of the upper boundary of the inner side surface IS on the sagittal plane, the greater the volume of the cavity structure. By setting a range of the distance between the projection point $O_2$' of the center $O_2$ of the second pressure relief hole 1132 on the sagittal plane and the projection point J of the midpoint of the upper boundary of the inner side surface IS on the sagittal plane, it is possible to make the cavity structure have a suitable volume V while ensuring that the sound production component 11 at least partially inserts into the cavum concha, thereby improving the sound reception effect of the ear canal.

It should be noted that when the projection of the upper side surface 11-1 of the sound production component 11 on the sagittal plane is a curve or a folded line, the midpoint C1 of the projection of the upper side surface 11-1 of the sound production component 11 on the sagittal plane may be selected by a following exemplary manner. A line segment may be made between two points of the projection of the upper side surface 11-1 on the sagittal plane that have the largest distance along the long-axis direction, a midpoint on the line segment may be selected as a mid-plumb line, and a point at which the mid-plumb line intersects with the projection is the midpoint of the projection of the upper side surface 11-1 of the sound production component 11 on the sagittal plane. In some alternative embodiments, a point of the projection of the upper side surface 11-1 on the sagittal plane that has the smallest distance from a projection of the highest point of the second projection may be selected as the midpoint C1 of the projection of the upper side surface 11-1 of the sound production component 11 on the sagittal plane. The midpoint of the projection of the lower side surface 11-2 of the sound production component 11 on the sagittal plane is selected in the same manner as described above, for example, a point of the projection of the lower side surface 11-2 on the sagittal plane which has a largest distance from the projection of the highest point of the second projection may be selected as the midpoint C2 of the projection of the lower side surface 11-2 of the sound production component 11.

It should be noted that when only one pressure relief hole is provided on the sound production component 11, the pressure relief hole may be any one of the above-described first pressure relief hole 1131 and second pressure relief hole 1132. For example, the pressure relief hole may be the above-described first pressure relief hole 1131, which may be provided on the upper side surface LS. As another example, the pressure relief hole may be the above-described second pressure relief hole 1132, which may be provided on the lower side surface LS.

In some embodiments, in addition to the inner side surface IS, one or more other side surfaces of the housing 111 (e.g., the outer side surface OS, the upper side surface US, or the lower side surface LS, etc.) may be provided with at least two pressure relief holes 113. Setting the at least two pressure relief holes 113 may disrupt a standing wave in the rear cavity so that a resonance frequency of a sound directed from the pressure relief hole 113 to the outside of the housing 111 is as high as possible, resulting in a frequency response of the rear cavity with a wide flat region (e.g., a region prior to resonance peaks) and a better leakage reduction effect in a mid to high frequency (e.g., 2 kHz-6 kHz). Merely by way of example, the pressure relief hole 113 may include the first pressure relief hole 1131 and the second pressure relief hole 1132. The second pressure relief hole 1132 may be closer to the sound outlet 112 than the first pressure relief hole 1131. In some embodiments, the first pressure relief hole 1131 and the second pressure relief hole 1132 may be disposed on the same side surface of the housing 111. For example, the first pressure relief hole 1131 and the second pressure relief hole 1132 may be provided on the outer side surface OS, the upper side surface US, or the lower side surface LS, simultaneously. In some embodiments, the first pressure relief hole 1131 and the second pressure relief hole 1132 may be disposed on two different side surfaces of the housing 111, for example, the first pressure relief hole 1131 may be disposed on the outer side surface OS, and the second pressure relief hole 1132 may be provided on the upper side surface US, or, the first pressure relief hole 1131 may be provided on the outer side surface OS, and the second pressure relief hole 1132 may be provided on the lower side surface LS. In some embodiments, in order to destroy the standing wave in the rear cavity to the greatest extent, the two pressure relief holes 113 may be located on two opposite side surfaces of the housing 111, for example, the first pressure relief hole 1131 may be disposed on the upper side surface US, and the second pressure relief hole 1132 may be disposed on the lower side surface LS. For ease of description, the present disclosure is exemplarily illustrated with the first pressure relief hole 1131 disposed on the upper side surface US and the second pressure relief hole 1132 disposed on the lower side surface LS.

In some embodiments, in order to avoid that sound output via the first pressure relief hole 1131 and the second pressure relief hole 1132 affecting the volume of sound output via the sound outlet 112 at a listening position, the first pressure relief hole 1131 and the second pressure relief hole 1132 may be as far away from the sound outlet 112 as possible. For example, a center of the sound outlet 112 may be made to be located on or near a mid-plumb surface of a line connecting a center of the first pressure relief hole 1131 and a center of the second pressure relief hole 1132. For example, a distance between the center of the sound outlet 112 and the mid-plumb plane of the line connecting the center of the first pressure relief hole 1131 and the center of the second pressure relief hole 1132 is in a range of 0 mm to 2 mm. In some embodiments, in order to further avoid the sound emitted from the second pressure relief hole 1132 from canceling with the sound emitted from the sound outlet 112 in the ear canal (i.e., the listening position) and decreasing the listening volume, an area of the second pressure relief hole 1132 may be reduced to reduce an intensity of the sound directed from the second pressure relief hole 1132 and transmitted to the ear canal, at which time, the area of the second pressure relief hole 1132 may be smaller than an area of the first pressure relief hole 1131.

It should be known that since the sound outlet 112 and the pressure relief hole 113 (e.g., the first pressure relief hole 1131 and the second pressure relief hole 1132) are provided on the housing 111 and each side surface of the housing 111 has a certain thickness, the sound outlet 112 and the pressure relief hole 113 are holes with a certain depth. At this time, the sound outlet 112 and the pressure relief hole 113 may both have an inner opening and an outer opening. For ease of description, in the present disclosure, the center of the sound outlet 112 as described above and below refers to a centroid of the outer opening of the sound outlet 112, and the center of the pressure relief hole 113 as described above and below refers to a centroid of the outer opening of the pressure relief hole 113 (e.g., the center $O_1$ of the first pressure relief hole 1131 refers to a centroid of an outer opening of the first pressure relief hole 1131, and the center $O_2$ of the second pressure relief hole 1132 refers to a centroid of an outer opening of the second pressure relief hole 1132). In the present disclosure, for ease of description, areas of the sound outlet 112 and the pressure relief hole 113 (e.g., the first pressure relief hole 1131 and/or the second pressure relief hole 1132) refer to areas of the outer openings of the sound outlet 112 and the pressure relief hole 113 (e.g., an area of the outer opening of the sound outlet 112 on the inner side surface IS, an area of the outer opening of the first pressure relief hole 1131 on the upper side surface US, and an area of the outer opening of the second pressure relief hole 1132 on the lower side surface LS). It should be known that in other embodiments, the areas of the sound outlet 112 and the pressure relief hole 113 also refer to other cross-sectional areas of the sound outlet 112 and the pressure relief hole 113, such as areas of the inner openings of the sound outlet 112 and/or the pressure relief hole 113, or average areas of the inner openings and the outer openings of the sound outlet 112 and/or the pressure relief hole 113, etc.

In some embodiments, the first pressure relief hole 1131 and the second pressure relief hole 1132 may be staggered along the X-direction such that the first pressure relief hole 1131 and the second pressure relief hole 1132 are not blocked by the tragus. In some embodiments, a distance between the center $O_1$ of the first pressure relief hole 1131 and the center $O_2$ of the second pressure relief hole 1132 may be in a range of 7 mm to 15.2 mm. In some embodiments, in order to make the first pressure relief hole 1131 and the second pressure relief hole 1132 not be blocked by the tragus while ensuring that the sound production component 11 has a suitable size to improve the wearing stability, the distance between the center $O_1$ of the first pressure relief hole 1131 and the center $O_2$ of the second pressure relief hole 1132 may be in a range of 8 mm to 13 mm. In some embodiments, the distance between the center $O_1$ of the first pressure relief hole 1131 and the center $O_2$ of the second pressure relief hole 1132 may be 12.64 mm. In some embodiments, the distance between the center $O_1$ of the first pressure relief hole 1131 and the center $O_2$ of the second pressure relief hole 1132 may be in a range of 7.5 mm to 14 mm. In some embodiments, the distance between the center $O_1$ of the first pressure relief hole 1131 and the center $O_2$ of the second pressure relief hole 1132 may be in a range of 12 mm to 13 mm. In some embodiments, the distance between the center $O_1$ of the first pressure relief hole 1131 and the center $O_2$ of the second pressure relief hole 1132 may be in a range of 13 mm to 15.2 mm.

As shown in FIG. 12, in some embodiments, the distance between the midpoint of the projection of the upper side surface 11-1 or the lower side surface 11-2 of the sound production component 11 on the sagittal plane and the highest point of the second projection may reflect the size of the sound production component 11 along the short-axis direction Y (a direction indicated by an arrow Y illustrated in FIG. 12) as well as a position of the sound production component 11 relative to the cavum concha. In order to ensure that the earphone 10 does not block the user's ear canal opening while improving the listening effect of the earphone 10, in some embodiments, a distance d10 between the midpoint C1 of the projection of the upper side surface 11-1 of the sound production component 11 on the sagittal plane and the highest point A1 of the second projection is in a range of 20 mm to 38 mm, and a distance d11 between the midpoint C2 of the projection of the lower side surface 11-2 of the sound production component 11 on the sagittal plane and the highest point A1 of the second projection is in a range of 32 mm to 57 mm. In some embodiments, by rationally setting the distance between the midpoint of the projection of the upper side surface 11-1 or the lower side surface 11-2 of the sound production component 11 on the sagittal plane and the highest point of the second projection, it is also possible to control a position of a leaking structure formed between the sound production component 11 and the cavum concha. In some embodiments, by setting the distance between the midpoint of the projection of the upper side surface 11-1 or the lower side surface 11-2 of the sound production component 11 on the sagittal plane and the highest point of the second projection to be relatively large, it is possible to make it easier to form the first leaking structure UC between the sound production component 11 and the cavum concha. For example, when the distance d10 between the midpoint C1 of the projection of the upper side surface 11-1 of the sound production component 11 on the sagittal plane and the highest point A1 of the second projection is in a range of 36 mm to 38 mm, and the distance d11 between the midpoint C2 of the projection of the lower side surface 11-2 of the sound production component 11 on the sagittal plane and the highest point A1 of the second projection is in a range of 50 mm to 57 mm, it is easier to form the first leaking structure UC between the sound production component 11 and the cavum concha. In some embodiments, by setting the distance between the midpoint of the projection of the upper side surface 11-1 or the lower side surface 11-2 of the sound production component 11 on the sagittal plane and the highest point of the second projection, it is possible to easily form the second leaking structure LC between the sound production component 11 and the cavum concha. For example, when the distance d10 between the midpoint C1 of the projection of the upper side surface 11-1 of the sound production component 11 on the sagittal plane and the highest point A1 of the second projection is in a range of 20 mm to 24 mm, and the distance d11 between the midpoint C2 of the projection of the lower side surface 11-2 of the sound production component 11 on the sagittal plane and the highest point A1 of the second projection is in a range of 32 mm to 36 mm, it is easier to form the second leaking structure LC between the sound production component 11 and the cavum concha. In some embodiments, by setting the distance between the midpoint of the projection of the upper side surface 11-1 and/or the lower side surface 11-2 on the sagittal plane and the highest point of the second projection, it is easier to form both the first leaking structure UC and the second leaking structure LC between the sound production component 11 and the cavum concha. For example, when the distance d10 between the midpoint C1 of the projection of the upper side surface 11-1 of the sound production component 11 on the sagittal plane and the highest point A1 of the second projection is in a range of 24 mm to 36 mm, and the distance d11 between the midpoint C2 of the projection of the lower side surface 11-2 of the sound production component 11 on the sagittal plane and the highest point A1 of the second projection is in a range of 36 mm to 50 mm, it is easier to form the first leaking structure UC and the second leaking structure LC between the sound production component 11 and the cavum concha. In some embodiments, in order to improve the listening effect, the distance d10 between the midpoint C1 of the projection of the upper side surface 11-1 of the sound production component 11 on the sagittal plane and the highest point A1 of the second projection is in a range of 24 mm-36 mm, and the distance d11 between the midpoint C2 of the projection of the lower side surface 11-2 of the sound production component 11 on the sagittal plane and the highest point A1 of the second projection is in a range of 36 mm to 54 mm. In some embodiments, the distance between the midpoint C1 of the projection of the upper side surface 11-1 of the sound production component 11 on the sagittal plane and the highest point A1 of the second projection is in a range of 27 mm to 34 mm, and the distance between the midpoint C2 of the projection of the lower side surface 11-2 of the sound production component 11 on the sagittal plane and the highest point A1 of the second projection is in a range of 38 mm to 50 mm.

In some embodiments, the greater the distance between the projection point $O_4$' of the center $O_4$ of the sound outlet 112 on the sagittal plane and the projection point J of the midpoint of the upper boundary of the inner side surface IS on the sagittal plane, the greater the volume V of the cavity structure. Accordingly, in some embodiments, on the premise that the sound production component 11 at least partially inserts into the cavum concha, in order to enable the sound outlet 112 to be close to the ear canal, and for the cavity structure to have a suitable volume V for a better sound reception effect, the distance between the projection point $O_4$' of the center $O_4$ of the sound outlet 112 on the sagittal plane and the projection point J of the midpoint of the upper boundary of the inner side surface IS on the sagittal plane is in a range of 10.0 mm to 15.2 mm. In some embodiments, in order to improve the sound reception effect of the ear canal, the distance between the projection point $O_4$' of the center $O_4$ of the sound outlet 112 on the sagittal plane and the projection point J of the midpoint of the upper boundary of the inner side surface IS on the sagittal plane is in a range of 11.0 mm to 14.2 mm. In some embodiments, in order to improve the sound reception effect of the ear canal, the distance between the projection point $O_4$' of the center $O_4$ of the sound outlet 112 on the sagittal plane and the projection point J of the midpoint of the upper boundary of the inner side surface IS on the sagittal plane is in a range of 12.0 mm to 14.7 mm. In some embodiments, in order to improve the sound reception effect of the ear canal, the distance between the projection point $O_4$' of the center $O_4$ of the sound outlet 112 on the sagittal plane and the projection point J of the midpoint of the upper boundary of the inner side surface IS on the sagittal plane is in a range of 12.5 mm to 14.2 mm.

In some embodiments, in order to improve the sound reception effect of the ear canal, the distance between the projection point $O_4$' of the center $O_4$ of the sound outlet 112 on the sagittal plane and the projection point J of the midpoint of the upper boundary of the inner side surface IS on the sagittal plane is in a range of 13.0 mm to 13.7 mm.

In some embodiments, the greater the distance between the projection point $O_4$' of the center $O_4$ of the sound outlet 112 on the sagittal plane and the projection point K of the ⅓ point of the lower boundary of the inner side surface IS on the sagittal plane, the greater the volume V of the cavity structure. Thus, on the premise that the sound production component 11 at least partially inserts into the cavum concha, the sound outlet 112 is set to be close to the ear canal and the cavity structure is set to have a suitable volume V so that the ear canal has a better sound reception effect. In some embodiments, the distance between the projection point $O_4$' of the center $O_4$ of the sound outlet 112 on the sagittal plane and the projection point K of the ⅓ point of the lower boundary of the inner side surface IS on the sagittal plane is in a range of 3.5 mm to 5.6 mm. In some embodiments, in order to improve the sound reception effect of the ear canal, the distance between the projection point $O_4$' of the center $O_4$ of the sound outlet 112 on the sagittal plane and the projection point K of the ⅓ point of the lower boundary of the inner side surface IS on the sagittal plane is in a range of 3.9 mm to 5.2 mm. In some embodiments, in order to improve the sound reception effect of the ear canal, the distance between the projection point $O_4$' of the center $O_4$ of the sound outlet 112 on the sagittal plane and the projection point K of the ⅓ point of the lower boundary of the inner side surface IS on the sagittal plane is in a range of 4.3 mm to 4.8 mm. In some embodiments, in order to improve the sound reception effect of the ear canal, the distance between the projection point $O_4$' of the center $O_4$ of the sound outlet 112 on the sagittal plane and the projection point K of the ⅓ point of the lower boundary of the inner side surface IS on the sagittal plane is in a range of 4.5 mm to 4.6 mm.

By setting the distance between the projection point $O_4$' of the center $O_4$ of the sound outlet 112 on the sagittal plane and the projection point J of the midpoint of the upper boundary of the inner side surface IS on the sagittal plane, and the distance between the projection point $O_4$' of the center $O_4$ of the sound outlet 112 on the sagittal plane and the projection point K of the ⅓ point of the lower boundary of the inner side surface IS, the sound outlet 112 may be made to be relatively close to both the first leaking structure UC and the second leaking structure LC, so that the listening effect can be improved. Furthermore, this setup also ensures that under the premise that the sound production component 11 at least partially inserts into the cavum concha, the sound outlet 112 can be as close as possible to the ear canal, and that the cavity structure has a suitable volume to have a better sound reception effect of the ear canal.

In some embodiments, when the first leaking structure UC and the second leaking structure LC are formed between the sound production component 11 and the cavum concha, in order to improve the sound reception effect of the ear canal, a distance between the ear canal opening and the first leaking structure UC or the second leaking structure LC may be controlled within a reasonable range. In some embodiments, in order to improve the sound reception effect of the ear canal, the distance between the projection point K of the ⅓ point of the lower boundary of the inner side surface IS on the sagittal plane and the projection point $O_3$' of the center $O_3$ of the ear canal opening on the sagittal plane is in a range from 1.76 mm to 2.64 mm; and the distance between the projection point J of the midpoint of the upper boundary of the inner side surface IS on the sagittal plane and the projection point $O_3$' of the center $O_3$ of the ear canal opening on the sagittal plane is in a range of 12 mm to 18 mm. In some embodiments, in order to improve the sound reception effect of the ear canal, the distance between the projection point K of the ⅓ point of the lower boundary of the inner side surface IS on the sagittal plane and the projection point $O_3$' of the center $O_3$ of the ear canal opening on the sagittal plane is in a range from 1.96 mm to 2.44 mm; and the distance between the projection point J of the midpoint of the upper boundary of the inner side surface IS on the sagittal plane and the projection point $O_3$' of the center $O_3$ of the ear canal opening on the sagittal plane is in a range of 13 mm to 17 mm. In some embodiments, in order to improve the sound reception effect of the ear canal, the distance between the projection point K of the ⅓ point of the lower boundary of the inner side surface IS on the sagittal plane and the projection point $O_3$' of the center $O_3$ of the ear canal opening on the sagittal plane is in a range from 2.16 mm to 2.24 mm; and the distance between the projection point J of the midpoint of the upper boundary of the inner side surface IS on the sagittal plane and the projection point $O_3$' of the center $O_3$ of the ear canal opening on the sagittal plane is in a range of 14 mm to 16 mm.

In the wearing mode of FIG. 8, due to a relatively close position of the sound outlet 112 on the inner side surface IS to the ear canal, a ratio of a distance between the center of the sound outlet 112 and the upper vertex T1 of the ear-hook to a distance between the center of the sound outlet 112 and the upper side surface US of the sound production component may not be too large. In addition, in order to ensure that there is sufficient spacing between the sound production component 11 and the upper vertex T1 of the ear-hook for the sound production component 11 to insert into the cavum concha, the ratio of the distance between the center of the sound outlet 112 and the upper vertex T1 of the ear-hook to the distance between the center of the sound outlet 112 and the upper side surface US of the sound production component may not be too small. In some embodiments, when a user wears the earphone 10, the ratio of the distance between the center of the sound outlet 112 and the upper vertex T1 of the ear-hook to the distance between the center of the sound outlet 112 and the upper side surface US of the sound production component is in a range of 1.94 to 2.93. In some embodiments, when the user wears the earphone 10, the ratio of the distance between the center of the sound outlet 112 and the upper vertex T1 of the ear-hook to the distance between the center of the sound outlet 112 and the upper side surface US of the sound production component is in a range of 2.2 to 2.6.

When the distance d13 between the center C1 of the projection of the upper side surface 11-1 of the sound production component 11 on the sagittal plane and the upper vertex T1 of the ear-hook is in a range of 21 mm to 32 mm, on the premise that the sound production component 11 at least partially inserts into the cavum concha, in order to ensure that the projection of the sound outlet 112 on the sagittal plane can be partially or wholly located in the cavum concha region, when the user wears the earphone 10, a distance between the center $O_4$ of the sound outlet 112 and the upper vertex T1 of the ear-hook is in a range of 22.5 mm to 34.5 mm. In some embodiments, in order to allow the sound outlet 112 to be close to the listening position (i.e., the ear canal opening) and not block the ear canal opening, when the user wears the earphone 10, the distance between the center $O_4$ of the sound outlet 112 and the upper vertex T1 of the ear-hook is in a range of 25 mm to 32 mm. In some embodiments, when the user wears the earphone 10, the distance between the center $O_4$ of the sound outlet 112 and the upper vertex T1 of the ear-hook is in a range of 27.5 mm 29.5 mm. In some embodiments, when the user wears the earphone 10, the distance between the center $O_4$ of the sound outlet 112 and the upper vertex T1 of the ear-hook is in a range of 28 mm to 29 mm. In some embodiments, when the user wears the earphone 10, the distance between the projection of the center $O_4$ of the sound outlet 112 on the sagittal plane and the projection of the upper vertex T1 of the ear-hook on the sagittal plane is in a range of 18 mm to 30 mm.

By setting a range of the distance between the center C1 of the projection of the upper side surface 11-1 of the sound production component 11 on the sagittal plane and the upper vertex T1 of the ear-hook, it is possible to ensure that the earphone 10 does not block the ear canal opening of the user while improving the listening effect of the earphone; and by setting a range of the distance between the center $O_4$ of the sound outlet 112 and the upper vertex T1 of the ear-hook, it is possible to improve the listening effect by ensuring that the sound production component 11 at least partially inserts into the cavum concha, so that the projection of the sound outlet 112 on the sagittal plane may be partially or wholly located in the cavum concha region.

Figure 13:
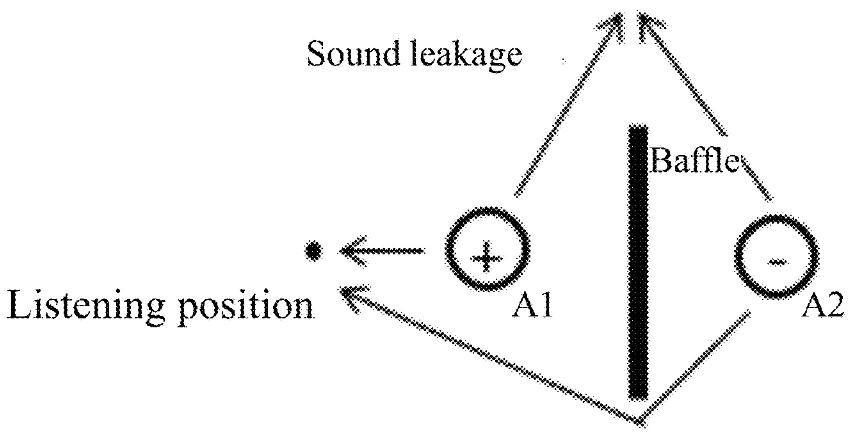
FIG. 13 is a schematic diagram illustrating an exemplary distribution of a baffle provided between two sound sources of a dipole sound source according to some embodiments of the present disclosure.

FIG. 13 is a schematic diagram illustrating an exemplary distribution of a baffle provided between two sound sources of a dipole sound source according to some embodiments of the present disclosure. As shown in FIG. 13, when a baffle is provided between a point sound source A1 and a point sound source A2, in the near-field, a sound wave of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, the amplitude difference between the sound waves of the point sound source A1 and the point sound source A2 at the listening position increases compared to the case without the baffle, thus reducing the degree of cancellation of the two sounds at the listening position and making the volume at the listening position increase. In the far-field, since the sound waves generated by the point sound source A1 and the point sound source A2 can interfere without bypassing the baffle in a large spatial area (similar to the case without the baffle), the sound leakage in the far-field does not increase significantly compared to the case without the baffle. Therefore, a baffle structure around one of the point sound sources A1 and A2 may significantly increase the volume of the near-field listening position without significantly increasing the volume of the far-field sound leakage.

Figure 14:
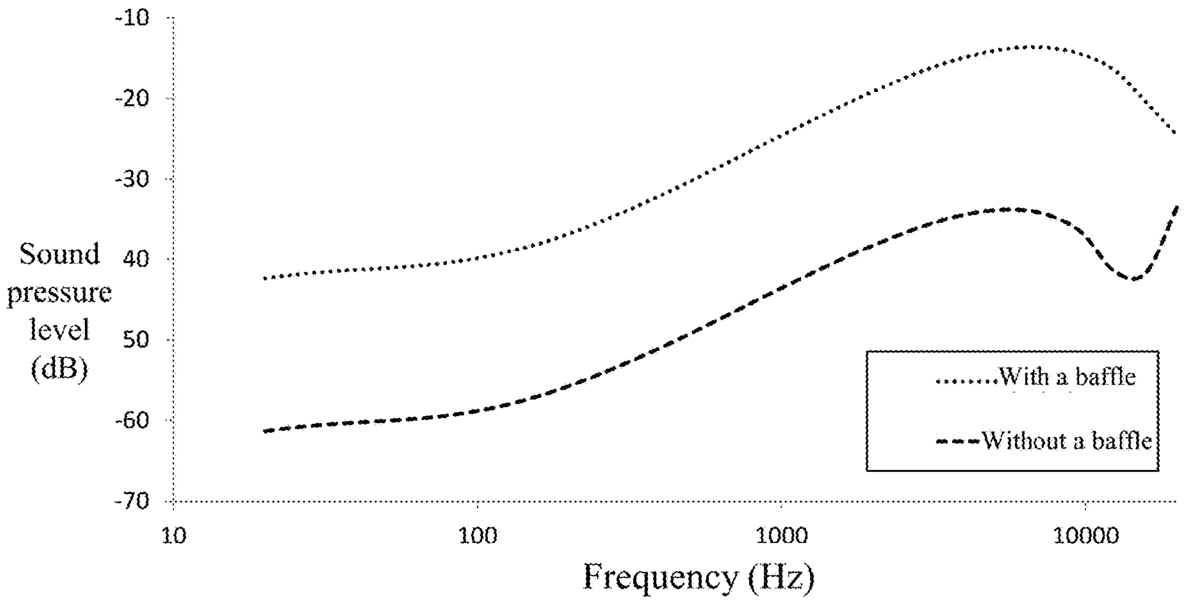
FIG. 14 is a diagram illustrating sound leakage indexes with and without a baffle between two sound sources of a dipole sound source according to some embodiments of the present disclosure.

FIG. 14 is a diagram illustrating sound leakage indexes with and without a baffle between two sound sources of a dipole sound source according to some embodiments of the present disclosure. After adding the baffle between the two point sound sources, in the near-field, it is equivalent to increasing the distance between the two point sound sources, the volume of the listening position in the near-field is equivalent to being generated by the double-point sound source at a greater distance, the listening volume in the near-field is significantly increased compared to the case without the baffle; in the far-field, a sound field of the double-point sound source is less affected by the baffle, and the resulting sound leakage is equivalent to being generated by the double-point sound source at a smaller distance. Therefore, as shown in FIG. 14, after adding the baffle, the leakage index is much smaller than that without the baffle, i.e., at the same listening volume, the sound leakage in the far-field is smaller than that in the case without the baffle, and the sound leakage reduction ability is obviously enhanced.

Figure 15:
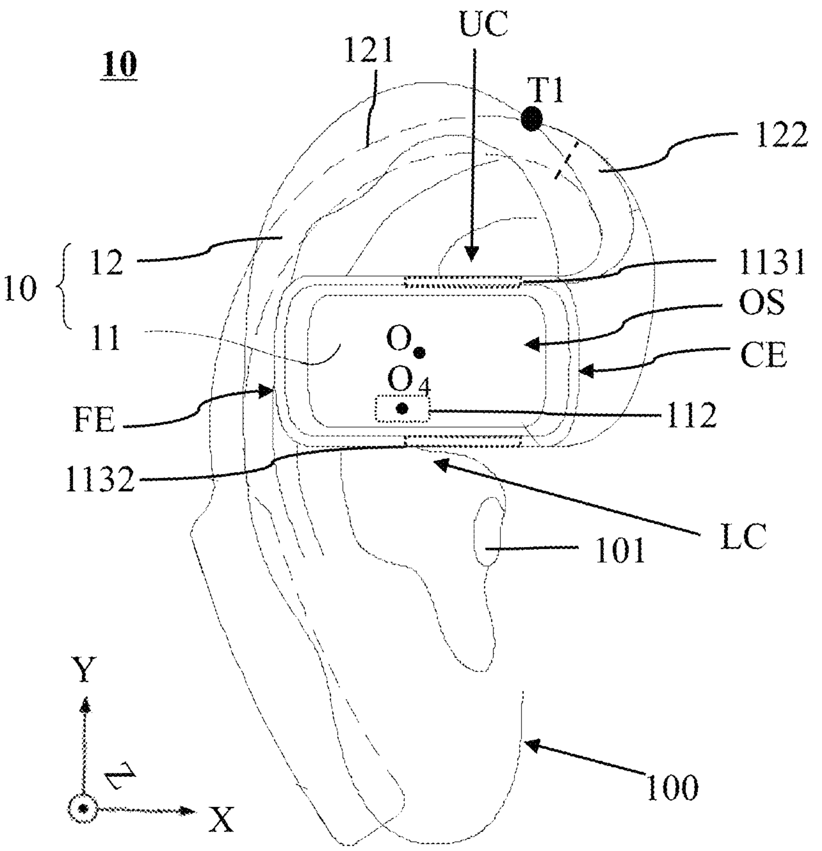
FIG. 15 is a schematic diagram illustrating an earphone at least partially covering an antihelix region according to some embodiments of the present disclosure.
Figure 16:
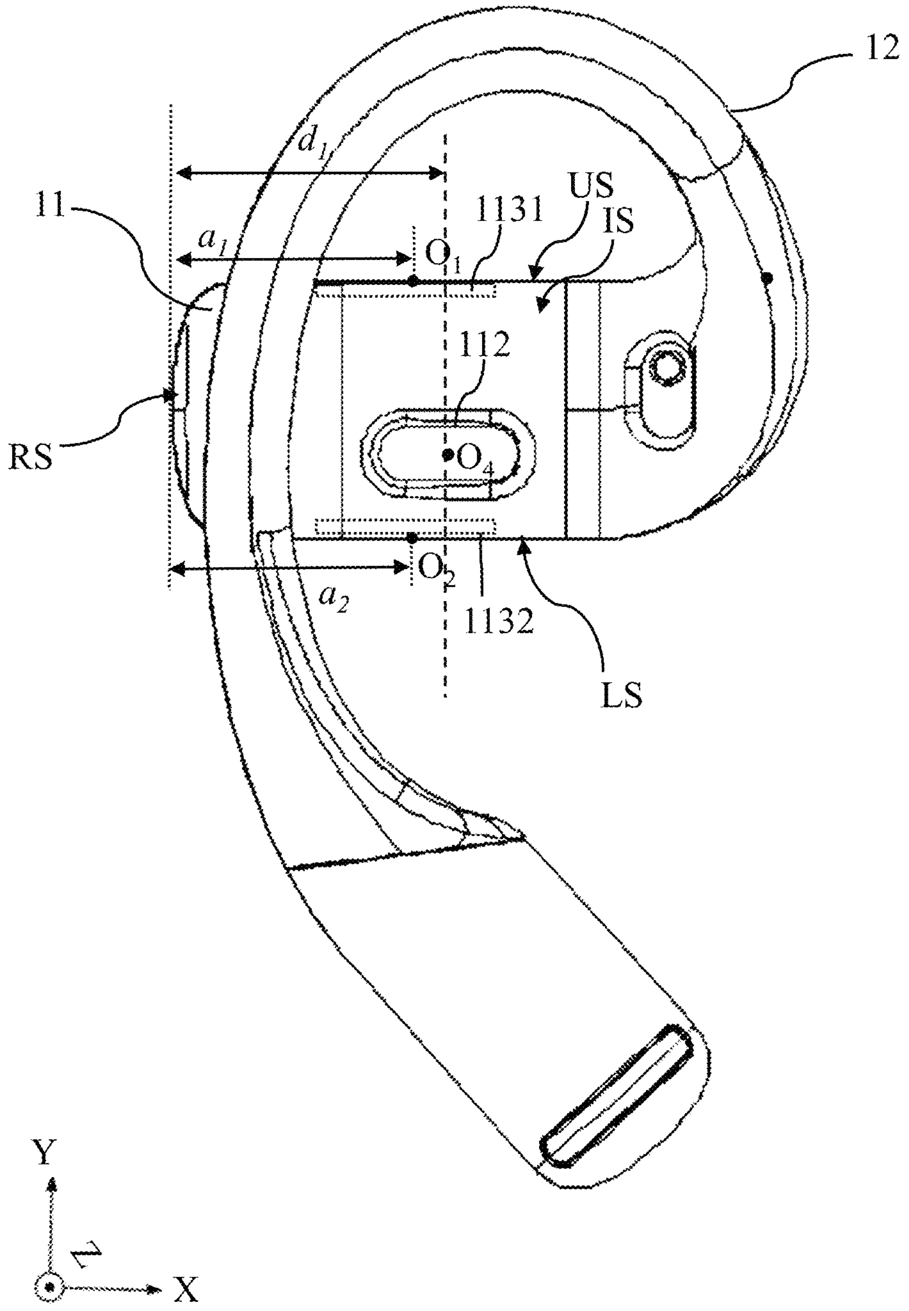
FIG. 16 is a schematic diagram illustrating a structure of a side of the earphone shown in FIG. 15 facing the ear.

FIG. 15 is a schematic diagram illustrating an earphone at least partially covering an antihelix region according to some embodiments of the present disclosure. FIG. 16 is a schematic diagram illustrating a structure of a side of the open earphone shown in FIG. 15 facing the ear.

Referring to FIG. 15, in some embodiments, at least a portion of the sound production component 11 may cover an antihelix region of a user in a wearing state, wherein the antihelix region may include one or more positions of the antihelix 105, the upper foot 1011 of the antihelix, the lower foot 1012 of the antihelix shown in FIG. 1, at which time the sound production component 11 is located above the cavum concha 102 and an ear canal opening, and the user's ear canal opening is in an open state. In some embodiments, the sound production component 11 is provided with the sound outlet 112 and one or more pressure relief holes 113 (e.g., the first pressure relief hole 1131 and/or the second pressure relief hole 1132), the sound outlet 112 is acoustically coupled to a front cavity of the earphone 10, and the pressure relief hole 113 is acoustically coupled to a rear cavity of the earphone 10. The sound outlet 112 coupled to the front cavity may be regarded as the point sound source A1 as shown in FIG. 13, the pressure relief hole 113 coupled to the rear cavity may be regarded as the point sound source A2 as shown in FIG. 13, and the ear canal may be regarded as the listening position as shown in FIG. 13. At least part of the housing of the sound production component 11 and/or at least part of the auricle may be regarded as the baffle shown in FIG. 13 to increase a difference between sound paths from the sound outlet 112 and the pressure relief hole 113 to the ear canal so as to increase the sound intensity at the ear canal while maintaining the far-field sound leakage reduction effect. When the earphone 10 adopts the structure and the wearing manner shown in FIG. 15, i.e., when at least a portion of the housing 111 is located at the antihelix 105, in terms of the listening effect, a sound wave of the sound outlet 112 may reach the ear canal directly. In this case, the sound outlet 112 may be provided at a position on the inner side surface IS near the lower side surface LS, and one or more pressure relief holes 113 may be provided at a position away from the sound outlet 112, for example, the pressure relief hole 113 (e.g., the first pressure relief hole 1131) may be provided at a position on the outer side OS or the upper side surface US away from the sound outlet 112. A sound wave of the pressure relief hole 113 needs to bypass the exterior of the sound production component 11 to interfere with the sound wave of the sound outlet 112 at the ear canal. In addition, an upper convex and lower concave structure on the auricle (e.g., the antihelix, tragus, etc., along its propagation path) increases the sound path of the sound transmitted from the pressure relief hole 113 to the ear canal. Thus, the sound production component 11 itself and/or at least a portion of the auricle is equivalent to a baffle between the sound outlet 112 and the pressure relief hole 113. The baffle increases the sound path from the pressure relief hole 113 to the ear canal and reduces the intensity of the sound waves from the pressure relief hole 113 in the ear canal, thereby reducing the cancellation degree between the two sounds emitted from the sound outlet 112 and the pressure relief hole 113 in the ear canal, resulting in an increase in the volume in the ear canal. In terms of the sound leakage effect, since the sound waves generated by both the sound outlet 112 and the pressure relief hole 113 can interfere without bypassing the sound production component 11 itself in a relatively large spatial area (similar to the case without a baffle), the sound leakage is not increased significantly. Therefore, by setting the sound outlet 112 and pressure relief hole 113 at suitable positions, it is possible to significantly increase the volume in the ear canal without a significant increase in the leakage sound volume.

In some embodiments, in order to enable at least a portion of a structure of the sound production component 11 to cover the antihelix region when the earphone 10 is in the wearing state, a ratio of the first distance $h_1$ between the centroid O of the first projection and the highest point of the second projection along a vertical axis direction to the height h of the second projection along the vertical axis direction may be in a range of 0.25 to 0.4. At this time, the sound production component 11 of the earphone 10 and the auricle may form the acoustic model as shown in FIG. 13, thereby increasing the listening volume of the earphone 10 at the listening position (e.g., at the ear canal opening), especially at middle and low-frequency, while maintaining a better far-field sound leakage cancellation effect. In some embodiments, in order to further improve the listening effect of the earphone at the listening position and the far-field sound leakage cancellation effect, positions of the sound outlet 112 and the pressure relief hole 113 on the housing 111 may be designed.

In some embodiments, with reference to FIG. 15, in order to ensure that the projection of the sound outlet 112 on the sagittal plane can be located partially or wholly within the cymba concha region when the earphone 10 is worn, so that the sound outlet 112 and the pressure relief hole 113 can be located on both sides of the antihelix (i.e., forming an acoustic model as shown in FIG. 13), when the user wears the earphone 10, a distance between the center $O_4$ of the sound outlet 112 and the upper vertex T1 of the ear-hook is in a range of 17.5 mm to 27.0 mm. In some embodiments, when the distance between the center $O_4$ of the sound outlet 112 and the upper vertex T1 of the ear-hook is too far or too close, this may cause problems in wearing the earphone 10, based on which, to ensure wearing comfort and stability, the distance between the center $O_4$ of the sound outlet 112 and the upper vertex T1 of the ear-hook is in a range of 20.0 mm to 25.5 mm. In some embodiments, when the user wears the earphone 10, the distance between the center $O_4$ of the sound outlet 112 and the upper vertex T1 of the ear-hook is in a range of 21.0 mm to 24.5 mm.

In some embodiments, the distance between the center $O_4$ of the sound outlet 112 and the upper vertex T1 of the ear-hook when the user wears the earphone 10 is in a range of 22.0 mm to 23.5 mm. In some embodiments, when the user wears the earphone 10, the distance between the center $O_4$ of the sound outlet 112 and the upper vertex T1 of the ear-hook is in a range of 22.5 mm to 23.0 mm.

In some embodiments, a ratio of the distance between the center $O_4$ of the sound outlet 112 and the upper vertex T1 of the ear-hook to a distance between upper and lower boundaries of the inner side surface IS (i.e., a distance between the upper side surface US and the lower side surface LS of the sound production component 11 and/or housing 111) may not be too large or too small. In some embodiments, when the upper side surface US and/or the lower side surface LS are curved surfaces, the distance between the upper side surface US and the lower side surface LS refers to a distance between a tangent plane of the upper side surface US that is farthest from the center of the sound production component and parallel to the long-axis of the sound production component and a tangent plane of the lower side surface LS that is farthest from the center of the sound production component and parallel to the long-axis of the sound production component. In the case where the distance between the center $O_4$ of the sound outlet 112 and the upper vertex T1 of the ear-hook is certain, if the above ratio is too small, a width of the inner side surface IS may be too large, which may result in a larger overall weight of the sound production component and a small distance between the housing and the ear-hook, thereby causing uncomfortable for the user to wear. If the above ratio is too large, the width of the inner side surface IS may be too small, which may result in a small area for the transducer of the sound production component 11 to push the air, thereby causing the low sound production efficiency of the sound production component. Thus, in order to ensure that the sound production efficiency of the sound production component is sufficiently high and to improve the comfort of the user in wearing the sound production component, and to make at least a portion of the projection of the sound production component 112 on the sagittal plane be disposed in the cymba concha region, when the user wears the earphone, the ratio of the distance between the center $O_4$ of the sound outlet 112 and the upper vertex T1 of the ear-hook to the distance between the upper and lower boundaries of the inner side surface IS is in a range of 0.95 to 1.55. In some embodiments, in order to take into account the wearing comfort and the sound production efficiency of the sound production component, a ratio of the distance between the center $O_4$ of the sound outlet 112 and the upper vertex T1 of the ear-hook to the width of the housing 111 is in a range of 1.05 to 1.45. In some embodiments, in order to take into account the wearing comfort and the sound production efficiency of the sound production component, the ratio of the distance between the center $O_4$ of the sound production component 112 and the upper vertex T1 of the ear-hook to the width of the housing 111 is in a range of 1.15 to 1.35. In some embodiments, in order to take into account the wearing comfort and the sound production efficiency of the sound production component, the ratio of the distance between the center $O_4$ of the sound production component 112 and the upper vertex T1 of the ear-hook to the width of the housing 111 is in a range of 1.20 to 1.30.

In some embodiments, in order to make the sound production component 11 have a better acoustic output quality, when the earphone 10 is in the wearing state, a distance between a centroid of the first projection of the sound production component 11 on the sagittal plane and a centroid of projection of the ear canal opening of the user on the sagittal plane may be no greater than 25 mm. In some embodiments, in order to make the sound production component 11 have a better acoustic output quality, the distance between the centroid of the first projection of the sound production component 11 on the sagittal plane and the centroid of projection of the ear canal opening of the user on the sagittal plane may be in a range of 5 mm to 23 mm. In some embodiments, the distance between the centroid of the first projection of the sound production component 11 on the sagittal plane and the centroid of projection of the ear canal opening of the user on the sagittal plane may be in a range of 8 mm to 20 mm. In some embodiments, by controlling the distance between the centroid of the first projection of the sound production component 11 on the sagittal plane and the centroid of projection of the ear canal opening of the user on the sagittal plane to be in a range of 10 mm to 17 mm, the centroid of the first projection may be made to locate approximately in the antihelix region of the user, whereby not only a sound output from the sound production component can be better transmitted to the user and the ear canal opening can be kept sufficiently open to obtain sound information in an external environment. At the same time, an inner contour of the auricle can also make it possible for at least a portion of the sound production component 11 to be subjected to a force that prevents it from falling, thereby improving the wearing stability of the earphone 10 to a certain extent. It should be noted that the shape of the projection of the ear canal opening on the sagittal plane may be approximately regarded as an ellipse, accordingly, a centroid of the projection of the ear canal opening on the sagittal plane may be a geocentric center of the ellipse.

In some embodiments, when the earphone 10 is pressed onto the ear 100, in order to keep the sound outlet 112 on the inner side surface IS from being blocked by ear tissue, the projection of the sound outlet 112 on the sagittal plane may partially or wholly coincide with a projection of an inner concave structure of the ear (e.g., the cymba concha 103) on the sagittal plane. In some embodiments, since the cymba concha 103 is communicated with the cavum concha 102 and the ear canal is located in the cavum concha 102, when at least a portion of the projection of the sound outlet 112 on the sagittal plane is located within the cymba concha 103, a sound output from the sound outlet 112 may reach the ear canal unobstructed, resulting in a higher volume received by the ear canal. In some embodiments, a long-axis dimension of the sound production component 11 may not be too long, as too long would cause a projection of the free end FE on the sagittal plane to exceed a projection of the ear on the sagittal plane, which would affect the fit of the sound production component 11 to the ear. Thus, the long-axis dimension of the sound production component 11 may be designed such that the projection of the free end FE on the sagittal plane does not exceed a projection of the antihelix 107 on the sagittal plane. In some embodiments, when the projection of the free end FE on the sagittal plane does not exceed the projection of the antihelix 107 on the sagittal plane, in order to keep at least a portion of the projection of the sound outlet 112 on the sagittal plane to be disposed within the cymba concha 103, i.e. the sound outlet 112 at least partially faces the cymba concha 103 when the earphone is worn, a distance d1 between the center $O_4$ of the sound outlet 112 and the rear side surface RS of the sound production component 11 along the X-direction is in a range of 9.5 mm to 15.0 mm. In some embodiments, the distance d1 between the center $O_4$ of the sound outlet 112 and the rear side surface RS of the sound production component 11 along the X-direction is in a range of 10.5 mm to 14.0 mm. In some embodiments, the distance d1 between the center $O_4$ of the sound outlet 112 and the rear side surface RS of the sound production component 11 along the X-direction is in a range of 11.0 mm to 13.5 mm. In some embodiments, the distance d1 between the center $O_4$ of the sound outlet 112 and the rear side surface RS of the sound production component 11 along the X-direction is in a range of 11.5 mm to 13.0 mm. In some embodiments, the distance d1 between the center $O_4$ of the sound outlet 112 and the rear side surface RS of the sound production component 11 along the X-direction is in a range of 12.0 mm to 12.5 mm.

In some embodiments, a distance a1 between the center $O_1$ of the first pressure relief hole 1131 and the rear side surface RS may be in a range of 8.60 mm to 15.68 mm. In some embodiments, in order to ensure the projection of the first pressure relief hole 1131 on the sagittal plane largely coincides with a projection of the inner concave structure of the ear on the sagittal plane, the distance a1 between the center $O_1$ of the first pressure relief hole 1131 and the rear side surface RS may be in a range of 9.60 mm to 11.92 mm. Preferably, the distance a1 between the center $O_1$ of the first pressure relief hole 1131 and the rear side surface RS may be in a range of 10.10 mm to 11.42 mm. More preferably, the distance a1 between the center $O_1$ of the first pressure relief hole 1131 and the rear side surface RS may be in a range of 10.30 mm to 11.12 mm. More preferably, the distance a1 between the center $O_1$ of the first pressure relief hole 1131 and the rear side surface RS may be in a range of 10.60 mm to 11.82 mm.

By setting the distance between the center $O_4$ of the sound outlet 112 and the rear side surface RS of the sound production component 11 along the X-direction, and the distance between the center $O_1$ of the first pressure relief hole 1131 and the rear side surface RS, it is possible to make the sound outlet 112, the first pressure relief hole 1131 as well as the housing 111 and the ear to be able to form an acoustic model similar shown in FIG. 13, thereby improving the listening effect.

In some embodiments, the pressure relief hole 113 may include the second pressure relief hole 1132, and the second pressure relief hole 1132 is provided on the lower side surface LS of the housing 111.

In some embodiments, since the sound outlet 112 is set close to the ear canal, the second pressure relief hole 1132 on the lower side surface LS may be set as far away from the sound outlet 112 as possible, so that the cancellation effect of the sound transmitted by the second pressure relief hole 1132 at the listening position (e.g., the ear canal) on the sound transmitted by the sound outlet 112 can be weakened, thereby increasing the volume at the listening position. Therefore, when the sound outlet 112 is set close to the lower side surface LS and a connection end CE, the second pressure relief hole 1132 may be set close to the rear side surface RS, so that a distance between the sound outlet 112 and the second pressure relief hole 1132 can be as far as possible. In some embodiments, when the projection of the free end FE on the sagittal plane does not exceed the projection of the antihelix 107 on the sagittal plane, a distance a2 between the center $O_2$ of the second pressure relief hole 1132 and the rear side surface RS may be in a range of 8.60 mm to 20.27 mm. In some embodiments, the distance a2 between the center $O_2$ of the second pressure relief hole 1132 and the rear side surface RS may be in a range of 8.60 mm to 12.92 mm. In some embodiments, the distance a2 between the center $O_2$ of the second pressure relief hole 1132 and the rear side surface RS may be in a range of 9.60 mm to 11.92 mm. In this setting, the distance between the second pressure relief hole 1132 and the rear side surface RS is relatively small, and the distance between the second pressure relief hole 1132 and the sound outlet 112 may be increased, so that the cancellation effect of the sound emitted from the second pressure relief hole 1132 on the sound emitted from the sound outlet 112 in the listening position (i.e., the ear canal) is weakened, which in turn increases the volume at the listening position. In some embodiments, the free end FE may contact with the ear (e.g., the helix 107) when the earphone 10 is in the wearing state, resulting in a portion of the upper side surface US and/or the lower side surface LS being blocked by the ear. Therefore, to avoid the second pressure relief hole 1132 on the lower side surface LS (or the first pressure relief hole 1131 on the upper side surface US) being blocked by the ear 100 to affect the acoustic performance of the earphone 10, the distance a2 between the center $O_2$ of the second pressure relief hole 1132 and the rear side surface RS may be in a range of 10.10 mm to 11.42 mm. In some embodiments, in order to avoid the second pressure relief hole 1132 being blocked by the ear so that an effective area of the second pressure relief hole 1132 is reduced, thereby causing the acoustic performance of the earphone 10 to be affected, the distance a2 between the center $O_2$ of the second pressure relief hole 1132 and the rear side surface RS is in a range of 10.30 mm to 11.12 mm. In some embodiments, the distance a2 between the center $O_2$ of the second pressure relief hole 1132 and the rear side surface RS may be in a range of 10.60 mm to 11.82 mm.

The basic concepts have been described above, apparently, in detail, as will be described above, and do not constitute limitations of the present disclosure. Although not explicitly stated here, those skilled in the art may make various modifications, improvements, and amendments to the present disclosure. These alterations, improvements, and modifications are intended to be suggested by the present disclosure, and are within the spirit and scope of the exemplary embodiments of the present disclosure.

Moreover, certain terminology has been used to describe embodiments of the present disclosure. As in "an embodiment," "one embodiment," and/or "some embodiments" means a feature, structure, or characteristic associated with at least one embodiment of the present disclosure. Therefore, it should be emphasized and noted that references to "one embodiment" "an embodiment" or "an alternative embodiment" two or more times in different places in the present disclosure do not necessarily refer to the same embodiment. In addition, some features, structures, or features in the present disclosure of one or more embodiments may be appropriately combined.

Similarly, it should be appreciated that in the foregoing description of embodiments of the present disclosure, various features are sometimes grouped together in a single embodiment, FIGure, or description thereof to streamline the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Accordingly, embodiments of the present disclosure are not limited to that precisely as shown and described. Accordingly, embodiments of the present disclosure are not limited to that precisely as shown and described.

What is claimed is:

1. An earphone, comprising:
- a sound production component, including a transducer and a housing accommodating the transducer; and
- an ear-hook, the ear-hook being configured to place the sound production component at a position adjacent to an ear canal but not blocking the ear canal in a wearing state, wherein,
- the sound production component and an auricle have a first projection and a second projection, respectively, on a sagittal plane,
- a first distance exists between a centroid of the first projection and a highest point of the second projection along a vertical axis direction,
- a ratio of the first distance to a height of the second projection along the vertical axis direction is in a range of 0.35 to 0.6,

- the housing is provided with a sound outlet on an inner side surface facing the auricle for conducting a sound generated by the transducer out of the housing and to the ear canal,
- one or more pressure relief holes are provided on one or more other side surfaces of the housing, and
- a distance between a projection point of a center of at least one pressure relief hole of the one or more pressure relief holes on the sagittal plane and a projection point of a ⅓ point of a lower boundary of the inner side surface on the sagittal plane is in a range of 13.76 mm to 20.64 mm or 8.16 mm to 12.24 mm.

2. The earphone according to claim 1, wherein the one or more pressure relief holes include a first pressure relief hole,
- the first pressure relief hole is provided on at least one side surface of an outer side surface, an upper side surface, or a lower side surface of the housing, and
- a distance between a projection point of a center of the first pressure relief hole on the sagittal plane and the projection point of the ⅓ point of the lower boundary of the inner side surface on the sagittal plane is in a range of 13.76 mm to 20.64 mm.

3. The earphone according to claim 2, wherein
- a distance between the projection point of the center of the first pressure relief hole on the sagittal plane and a projection point of a center of an ear canal opening on the sagittal plane is in a range of 13.76 mm to 20.64 mm; and
- a distance between a projection point of a center of the sound outlet on the sagittal plane and the projection point of the center of the ear canal opening on the sagittal plane is in a range of 2.2 mm to 3.8 mm.

4. The earphone according to claim 1, wherein a distance between a center of a first pressure relief hole and a center of the sound outlet is in a range of 5.12 mm to 15.11 mm.

5. The earphone according to claim 2, wherein a second distance exists between the centroid of the first projection and an end point of the second projection along a sagittal axis direction, and a ratio of the second distance to a width of the second projection along the sagittal axis direction is in a range of 0.4 to 0.7.

6. The earphone according to claim 5, wherein
- a distance between the center of the first pressure relief hole and a rear side surface of the housing is in a range of 10.44 mm to 15.68 mm; and
- a distance between a center of the sound outlet and the rear side surface is in a range of 8.15 mm to 12.25 mm.

7. The earphone according to claim 2, wherein a distance between the center of the first pressure relief hole and the inner side surface is in a range of 4.24 mm to 6.38 mm.

8. The earphone according to claim 1, wherein the one or more pressure relief holes includes a second pressure relief hole,
- the second pressure relief hole is provided on at least one side surface of an outer side surface, an upper side surface, or a lower side surface of the housing; and
- a distance between a projection point of a center of the second pressure relief hole on the sagittal plane and the projection point of the ⅓ point of the lower boundary of the inner side surface on the sagittal plane is in a range of 8.16 mm to 12.24 mm.

9. The earphone according to claim 8, wherein
- a distance between the projection point of the center of the second pressure relief hole on the sagittal plane and a projection point of a center of an ear canal opening on the sagittal plane is in a range of 6.88 mm to 10.32 mm; and a distance between a projection point of a center of the sound outlet on the sagittal plane and the projection point of the center of the ear canal opening on the sagittal plane is in a range of 2.2 mm to 3.8 mm.

10. The earphone according to claim 8, wherein a second distance exists between the centroid of the first projection and an end point of the second projection along a sagittal axis direction, and a ratio of the second distance to a width of the second projection along the sagittal axis direction is in a range of 0.4 to 0.7.

11. The earphone according to claim 10, wherein a distance between the center of the second pressure relief hole and a rear side surface of the housing is in a range of 13.51 mm to 20.27 mm; and a distance between a center of the sound outlet and the rear side surface is in a range of 8.15 mm to 12.25 mm.

12. The earphone according to claim 8, wherein a distance between the center of the second pressure relief hole and the inner side surface is in a range of 4.24 mm to 6.36 mm.

13. The earphone according to claim 8, wherein a distance between a midpoint of a projection of an upper side surface of the sound production component on the sagittal plane and a projection of an upper vertex of the ear-hook on the sagittal plane is in a range of 21 mm to 32 mm; and a distance between the projection point of the center of the second pressure relief hole on the sagittal plane and a projection point of a midpoint of an upper boundary of the inner side surface on the sagittal plane is in a range of 14.4 mm to 21.6 mm.

14. The earphone according to claim 1, wherein the one or more pressure relief holes includes a first pressure relief hole and a second pressure relief hole, and the first pressure relief hole and the second pressure relief hole are provided on different sidewalls of the housing.

15. The earphone according to claim 14, wherein a distance between a center of the first pressure relief hole and a center of the second pressure relief hole is in a range of 13.0 mm to 15.2 mm.

16. The earphone according to claim 14, wherein a distance between a midpoint of a projection of an upper side surface of the sound production component on the sagittal plane and the highest point of the second projection is in a range of 24 mm to 36 mm; and a distance between a midpoint of a projection of a lower side surface of the sound production component on the sagittal plane and the highest point of the second projection is in a range of 36 mm to 54 mm.

17. The earphone according to claim 1, wherein a distance of a projection point of a center of the sound outlet on the sagittal plane and the projection point of the ⅓ point of the lower boundary of the inner side surface on the sagittal plane is in a range of from 3.5 to 5.6 mm; and a distance between the projection point of the center of the sound outlet on the sagittal plane and a projection point of a midpoint of an upper boundary of the inner side surface on the sagittal plane is in a range of 10.0 mm to 15.2 mm.

18. The earphone according to claim 17, wherein a distance between the projection point of the ⅓ point of the lower boundary of the inner side surface on the sagittal plane and a projection point of a center of an ear canal opening on the sagittal plane is in a range of 1.76 mm to 2.64 mm; and a distance between the projection point of the midpoint of the upper boundary of the inner side surface on the sagittal plane and the projection point of the center of the ear canal opening on the sagittal plane is in a range of 12 mm to 18 mm.

19. The earphone according to claim 18, wherein a ratio of a distance between the center of the sound outlet and an upper vertex of the ear-hook to a distance between the center of the sound outlet and an upper side surface of the sound production component is in a range of 1.94 to 2.93.

20. The earphone according to claim 1, wherein a distance between a midpoint of a projection of an upper side surface of the sound production component on the sagittal plane and a projection of an upper vertex of the ear-hook on the sagittal plane is in a range of 21 mm to 32 mm; and a distance between a projection of a center of the sound outlet on the sagittal plane and the projection of the upper vertex of the ear-hook on the sagittal plane is in a range of 18 mm to 30 mm.

* * * * *